United States Patent
Rutkowski et al.

(10) Patent No.: US 12,434,530 B2
(45) Date of Patent: Oct. 7, 2025

(54) METHODS AND APPARATUS TO IDENTIFY RIDE HEIGHT SENSOR DISCREPANCIES

(71) Applicant: Ford Technologies, LLC, Dearborn, MI (US)

(72) Inventors: Brian D. Rutkowski, Ypsilanti, MI (US); David John Rutkowski, Grosse Ile, MI (US)

(73) Assignee: Ford Technologies, LLC, Dearborn, MI (US)

( * ) Notice: Subject to any disclaimer, the term of this patent is extended or adjusted under 35 U.S.C. 154(b) by 127 days.

(21) Appl. No.: 18/240,890

(22) Filed: Aug. 31, 2023

(65) Prior Publication Data

US 2025/0074131 A1  Mar. 6, 2025

(51) Int. Cl.
*B60G 17/0185*  (2006.01)
*B60G 17/019*  (2006.01)

(52) U.S. Cl.
CPC ... *B60G 17/0185* (2013.01); *B60G 17/01908* (2013.01); *B60G 17/01933* (2013.01); *B60G 2400/10* (2013.01); *B60G 2400/204* (2013.01); *B60G 2400/252* (2013.01); *B60G 2400/954* (2013.01); *B60G 2500/30* (2013.01); *B60G 2600/082* (2013.01)

(58) Field of Classification Search
CPC .......... B60G 17/0185; B60G 17/01908; B60G 17/01933; B60G 2400/204; B60G 2400/252; B60G 2400/954; B60G 2600/082; B60G 2400/25; B60G 2500/30; B60G 2800/914
See application file for complete search history.

(56) References Cited

U.S. PATENT DOCUMENTS

| | | | |
|---|---|---|---|
| 8,333,390 B2 | 12/2012 | Linsmeier et al. | |
| 8,755,971 B2 | 6/2014 | MacFarlane et al. | |
| 9,835,451 B2 | 12/2017 | Illg et al. | |
| 10,252,594 B2 | 4/2019 | D'Amato et al. | |
| 2007/0129865 A1* | 6/2007 | Kim | B60G 17/0185 701/37 |
| 2008/0021611 A1* | 1/2008 | Hiebert | B60G 17/0185 701/37 |
| 2018/0251000 A1 | 9/2018 | Norton et al. | |

OTHER PUBLICATIONS

Ha et al, "Height Sensor Fault Diagnosis for Electronic Air Suspension (EAS) System," IEEE International Symposium on Industrial Electronics, pp. 211-216, Jul. 5, 2009, Seoul, KR, 6 pages.

* cited by examiner

*Primary Examiner* — Jacob M Amick
(74) *Attorney, Agent, or Firm* — Lorne Forsythe; Hanley, Flight & Zimmerman

(57) ABSTRACT

Methods and apparatus to identify ride height sensor discrepancies are disclosed. An example apparatus disclosed herein includes machine readable instructions and programmable circuitry to at least one of instantiate or execute the machine readable instructions to compare a first sensor output of a first ride height sensor of a vehicle to a second sensor output of a second ride height sensor of the vehicle, increment a discrepancy counter based on the comparison of the first sensor output and the second sensor output, and generate an indication to service at least one of the first ride height sensor or the second ride height sensor after the discrepancy counter satisfies a threshold.

17 Claims, 8 Drawing Sheets

METHODS AND APPARATUS TO IDENTIFY RIDE HEIGHT SENSOR DISCREPANCIES

FIELD OF THE DISCLOSURE

This disclosure relates generally to vehicle sensors and, more particularly, to methods and apparatus to identify ride height sensor discrepancies.

BACKGROUND

Vehicle suspension systems often include elastic elements, such as springs, shock absorbers, and other mechanical elements. Vehicle suspension elements connect the body and frame of a vehicle to the wheels of the vehicle. The stiffness of the elastic elements of suspension systems affects the handling and performance of the vehicle. Some vehicles include active suspension systems, which use control elements to control the stiffness, position, and/or force applied to the suspension elements.

Figure 1A:
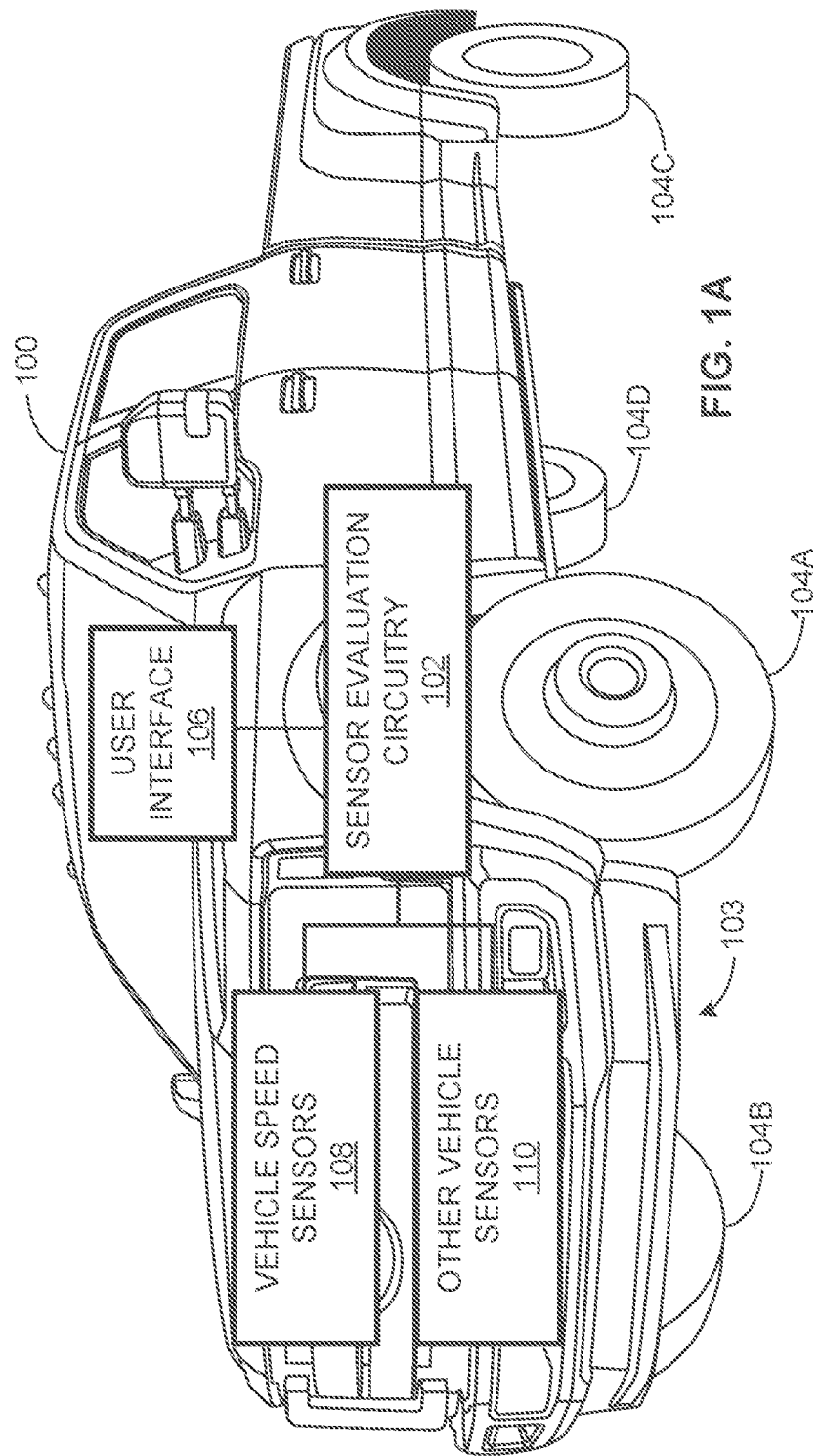
FIG. 1A is a perspective view of a vehicle in which examples disclosed herein can be implemented.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

As used herein, the orientation of features is described with reference to a lateral axis, a vertical axis, and a longitudinal axis of the vehicle associated with the features. As used herein, the longitudinal axis of the vehicle is parallel to a centerline of the vehicle. The terms "rear" and "front" are used to refer to directions along the longitudinal axis closer to the rear of the vehicle and the front of the vehicle, respectively. As used herein, the vertical axis of the vehicle is perpendicular to the ground on which the vehicle rests. The terms "below" and "above" are used to refer to directions along the vertical axis closer to the ground and away from the ground, respectively. As used herein, the lateral axis of the vehicle is perpendicular to the longitudinal and vertical axes and is generally parallel to the axles of the vehicle. As used herein, the terms "longitudinal," and "axial" are used interchangeably to refer to directions parallel to the longitudinal axis. As used herein, the terms "lateral" and "horizontal" are used to refer to directions parallel to the lateral axis. As used herein, the term "vertical" and "normal" are used interchangeably to refer to directions parallel to the vertical axis.

Many vehicles include ride height sensors (e.g., suspension position sensors, suspension displacement sensors, wheel displacement sensors, etc.), which output ride height information that can be utilized by a variety of vehicle systems. Ride height sensors are typically coupled to and/or adjacent to the suspension elements associated with one or more of the wheels of the vehicle. For example, the outputs of the ride height sensors of a vehicle can be utilized by vehicle leveling control systems, electronic shock absorber control systems/active suspension systems, semi-active suspension systems, and/or headlight leveling systems. Example systems for determining the weight of a vehicle using ride height information are disclosed in U.S. Pat. No. 11,008,014, which is hereby incorporated by reference in its entirety. If one or more of the ride height sensors provide inaccurate outputs and/or otherwise underperform, the operation of such vehicle systems can be adversely affected.

For example, inaccurate ride height sensor outputs can cause active suspension systems to behave in a manner that negatively affects the driving experience of the vehicle. Additionally, a poor driving experience can prompt the driver to take their vehicle to a technician for servicing. Technicians can have difficulty diagnosing an underperforming ride height sensor based on the unexpected performance of other vehicle systems.

The underperformance of the ride height sensors can be caused by internal electronics of the sensor, changes in of the mechanical components of the sensor, loose attachment of the sensor to the vehicle, and/or one or more disconnected link(s) to the vehicle. While some of these issues or discrepancies can be addressed by remounting/reconnecting the ride height sensor instead of replacing the ride height sensor, many technicians can have difficulty distinguishing between discrepancies that can be addressed by remounting the ride height sensor and discrepancies that require replacement of the ride height sensor. As such, technicians often replace otherwise functional ride height sensors that could be serviced by reinstallation.

Examples disclosed herein overcome the above-noted deficiencies for detecting a ride height sensor discrepancies by comparing the output of the ride height sensors of the vehicle. In some examples disclosed herein, the output of the ride height sensors of a vehicle can be compared when the vehicle is moving at a constant speed. In some examples disclosed herein, the output of cross-axle ride height sensors can be compared in real-time to identify discrepancies. In some examples disclosed herein, the output of a ride height sensor of a rear wheel can be compared to a time-delayed output of a ride height sensor of a longitudinally aligned front wheel. In some examples, the time delay can be determined based on the speed of the vehicle and the wheelbase of the vehicle. In some examples disclosed herein, after a first threshold number of discrepancies is recorded, a diagnostic code can be generated and stored on the electronic control unit of the vehicle. In some examples disclosed herein, after a second threshold number of discrepancies is recorded, an alert can be generated indicating the ride height sensors should be serviced. In some examples disclosed herein, an underperforming ride height sensor can be identified based on identifying a common ride height sensor in (1) a cross-axle set of ride height sensors with repeated discrepancies and (2) a longitudinally aligned set of ride height sensors with repeated discrepancies. Examples disclosed herein increase the likelihood and speed of a technician diagnosing and servicing a discrepancy-causing ride height sensor.

FIG. 1A is a perspective view of an example vehicle 100 in which examples disclosed herein can be implemented. In the illustrated example of FIG. 1A, the vehicle 100 includes example sensor evaluation circuitry 102, an example suspension system 103, an example first wheel 104A, an example second wheel 104B, an example third wheel 104C, and an example fourth wheel 104D. In the illustrated example of FIG. 1A, the vehicle 100 includes an example user interface 106, an example vehicle speed sensor 108, and example other vehicle sensor(s) 110.

The vehicle 100 is a motorized wheel-driven vehicle. In the illustrated example of FIG. 1A, the vehicle 100 is a pick-up truck. In other examples, the vehicle 100 can be any type of wheeled vehicle (e.g., a sedan, a coupe, a van, a pick-up truck, a sports utility vehicle, an all-terrain vehicle (ATV), farming equipment, etc.). In some examples, the vehicle 100 includes an internal combustion engine (e.g., a non-electrified vehicle, a partially electrified vehicle, etc.). In other examples, the vehicle 100 can be implemented as a fully electric vehicle. While in the illustrated example of FIG. 1A, the vehicle 100 has two axles and four wheels (e.g., the wheels 104A, 104B, 104C, 104D, etc.), in other examples, the vehicle 100 can have any number of axles and wheels.

The vehicle 100 includes the example suspension system 103. The suspension system 103 can include an independent suspension (e.g., a wishbone suspension, etc.), a solid axle suspension (e.g., a leaf spring suspension, etc.), or a combination thereof (e.g., a front axle independent suspension, a rear axle dependent suspension, etc.). The suspension system 103 includes suspension elements associated with corresponding ones of the wheels 104A, 104B, 104C, 104D, which are described below in conjunction with FIG. 1B.

The user interface 106 enables a user of the vehicle 100 to receive information from and input information to the sensor evaluation circuitry 102 and other systems of the vehicle 100. For example, the user interface 106 can be implemented by a display of the vehicle 100. Additionally or alternatively, the user interface 106 can include one or more dash indicator(s), one or more button(s) on the dashboard or steering wheel, one or more speakers, one or more microphones, etc. In some examples, the user interface 106 can be implemented by a mobile device of the user (e.g., a mobile phone, a smartwatch, a tablet, etc.).

The vehicle speed sensor 108 measures the speed of the vehicle 100. For example, the vehicle speed sensor 108 can be implemented by a global positioning system (GPS) associated with the vehicle 100 (e.g., an integrated GPS, a GPS associated with a mobile device of the operator, a standalone GPS device, etc.). Additionally or alternatively, the vehicle speed sensor 108 can be implemented by a speedometer of the vehicle 100, a tachometer of the vehicle 100, and/or any other suitable sensor associated with the vehicle 100. The other sensors 110 measure other parameters associated with the vehicle 100. In some examples, the other sensors 110 can include a sensor that measures the acceleration and/or deceleration of the vehicle 100 (e.g., an accelerometer, etc.), a brake torque sensor, a motor torque sensor, an engine torque sensor, and/or any other sensors associated with the vehicle 100. Additionally or alternatively, the other sensors 110 can include any other suitable sensors.

The sensor evaluation circuitry 102 accesses the output of the sensors of the vehicle 100 and can identify discrepancies therebetween. For example, the sensor evaluation circuitry 102 can access the output of ride height sensors associated with one or more of the wheels 104A, 104B, 104C, 104D, and/or the sensors 108, 110. An example implementation of the sensor evaluation circuitry 102 and ride height sensors are described in greater detail below in conjunction with FIGS. 1B and 2. In some examples, the sensor evaluation circuitry 102 can be implemented by the vehicle electronic control unit (ECU) and/or any other suitable computer associated with the vehicle 100. In other examples, the sensor evaluation circuitry 102 can be associated with any other suitable computing device (e.g., a mobile device associated with a user of vehicle 100, etc.) and/or a combination of computing devices (e.g., partly via a computer associated with the vehicle 100, partly via another computer, etc.).

Figure 1B:
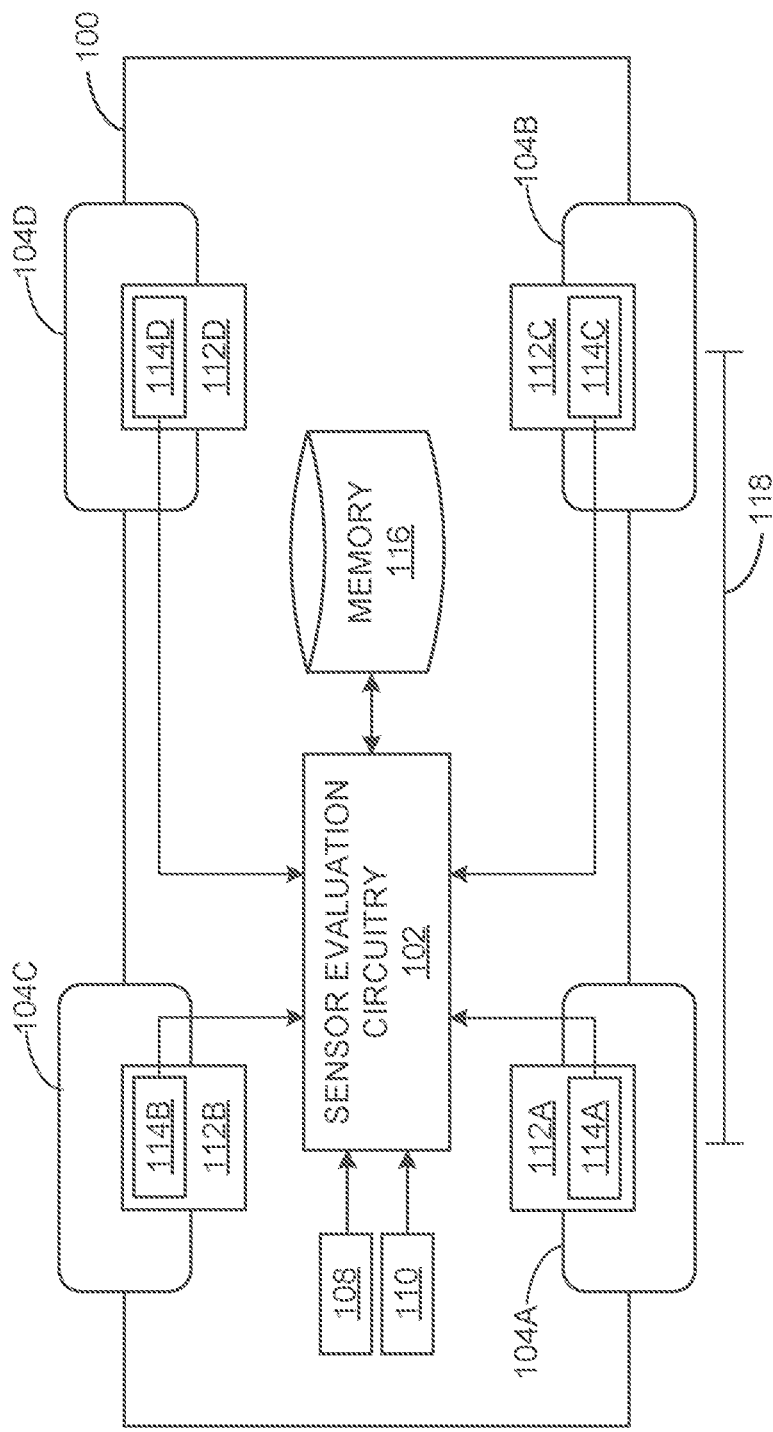
FIG. 1B is a schematic illustration of the vehicle of FIG. 1A including example sensor evaluation circuitry.

FIG. 1B is a schematic illustration of the vehicle 100 of FIG. 1B. In the illustrated example of FIG. 1B, the vehicle 100 includes the sensor evaluation circuitry 102, the wheels 104A, 104B, 104C, 104D, and the sensors 108, 110 of FIG. 1A. In the illustrated example of FIG. 1B, the vehicle 100 includes an example first suspension element 112A, an example second suspension element 112B, an example third suspension element 112C, and an example fourth suspension element 112D, which are associated with the wheels 104A, 104B, 104C, 104D, respectively. In the illustrated example of FIG. 1B, the suspension elements 112A, 112B, 112C, 112D includes an example first ride height sensor 114A, an example second ride height sensor 114B, an example third ride height sensor 114C, and an example fourth ride height sensor 114D, respectively. In the illustrated example of FIG. 1B, the sensor evaluation circuitry 102 is communicatively coupled to example memory 116. In the illustrated example of FIG. 1B, the vehicle 100 has an example wheelbase 118.

The suspension elements 112A, 112B, 112C, 112D are the damping and spring elements of the suspension system 103 associated with the corresponding ones of the wheels 104A, 104B, 104C, 104D. For example, each of the suspension elements 112A, 112B, 112C, 112D includes an elastic element (e.g., a leaf spring, a torsion bar, a coil spring, a bushing, an air spring, an oleo strut, a hydro-pneumatic spring, etc.) and a damping element (e.g., a twin-tubed shock absorber, a mono-tube shock absorber, a spool valve, etc.). In some such examples, one or more of the properties (e.g., the viscous damping coefficient, the stiffness, etc.) associated with each of the suspension elements 112A, 112B, 112C, 112D can be individually controlled based on the output of the ride height sensors 114A, 114B, 114C, 114D.

The ride height sensors 114A, 114B, 114C, 114D measure the ride height of the vehicle 100 adjacent the wheels 104A, 104B, 104C, 104D, respectively, and/or the displacement of the suspension elements 112A, 112B, 112C, 112D, respectively. In the illustrated example of FIG. 1B, the ride height sensors 114A, 114B, 114C, 114D are associated with the wheels 104A, 104B, 104C, 104D, respectively. As used herein, the term "cross-axle" refers to sets of ride height sensors associated with wheels and/or suspension elements associated with a common axle. For example, (1) the first ride height sensor 114A and the second ride height sensor 114B are a set of cross-axle ride height sensors and (2) the third ride height sensor 114C and the fourth ride height sensor 114D are a set of cross-axle ride height sensors. As used herein, the term "longitudinally-aligned" refers to sets of ride height sensors associated with wheels and/or suspension elements on a same lateral side of the vehicle 100 (e.g., a driver side, a passenger side, etc.). For example, (1) the first ride height sensor 114A and the third ride height sensor 114C are a set of longitudinally-aligned ride height sensors and (2) the second ride height sensor 114B and the fourth ride height sensor 114D are a set of longitudinally-aligned ride height sensors. In the illustrated example of FIG. 1B, the vehicle 100 includes the four ride height sensors 114A, 114B, 114C, 114D. In other examples, the vehicle 100 can include a different number of ride height sensors (e.g., more than four sensors, less than four sensors, etc.).

In some examples, the ride height sensors 114A, 114B, 114C, 114D can be mechanical displacement sensors (e.g., linear ride height sensor(s), rotary ride height sensor(s), etc.), optical ride height sensors, and/or a combination thereof. For example, if one or more of the ride height sensors 114A, 114B, 114C, 114D are rotary ride height sensors, some or all of the ride height sensors 114A, 114B, 114C, 114D can include a sensor body, coupled to the body and/or frame of the vehicle 100, and an arm extending between the sensor body of a non-rotating portion of corresponding ones of the wheels 104A, 104B, 104C, 104C (e.g., via a ball stud link, etc.). In some such examples, during operation, the deflection of the suspension elements 112A, 112B, 112C, 112D causes the arm of the ride height sensors 114A, 114B, 114C, 114D to rotate and output a signal based on the magnitude of the rotation, which can be correlated to the displacement of the suspension elements 112A, 112B, 112C, 112D.

Example operational issues associated with such rotary mechanical sensors include loose connections between the arm and the wheel (e.g., one of the wheels 104A, 104B, 104C, 104D, etc.), and a loose mounting of the sensor body to the vehicle 100. In some cases, a ride height sensor exhibiting a discrepancy does not require replacement and can be serviced by reinstalling, remounting, and/or reconnecting the affected components. In other examples, the ride height sensors 114A, 114B, 114C, 114D can be any other suitable type of sensor (e.g., a magnetoelastic sensor, a load cell, a strain gauge, an accelerometer, etc.).

The wheelbase 118 is the longitudinal distance between the center of the front wheels of the vehicle 100 (e.g., the wheels 104A, 104C, etc.) and the center of the rear wheels of the vehicle 100 (e.g., the wheels 104B, 104D, etc.). In some examples, the sensor evaluation circuitry 102 can use the wheelbase 118 of the vehicle 100 and an output of the vehicle speed sensor 108 to determine the time delay between when a terrain feature is encountered by the front wheels of the vehicle 100 and the rear wheel of the vehicle 100. As used herein, a terrain feature is any feature of the driving surface that causes a change in an output of a ride height sensor. Example terrain features include potholes, speedbumps, slopes, rumble strips, curbs, and other obstacles/debris on the driving surface of the vehicle 100. In some examples, the wheelbase 118 can be measured during the manufacturing and/or calibration of the vehicle 100 and stored in the memory 116. Additionally or alternatively, the wheelbase 118 can be determined based on the make and model of the vehicle 100 and stored in the memory 116.

The sensor evaluation circuitry 102 can identify discrepancies in the output of one or more of the ride height sensors 114A, 114B, 114C, 114D. For example, the sensor evaluation circuitry 102 can compare the output of cross-axle ones of the ride height sensors 114A, 114B, 114C, 114D (e.g., the ride height sensors 114A, 114B associated with the front axle of the vehicle 100, the ride height sensors 114C, 114D associated with the rear axle of the vehicle 100, etc.) and/or the output of longitudinally aligned ones of the ride height sensors 114A, 114B, 114C, 114D (e.g., the ride height sensors 114A, 114C associated with the driver side of the vehicle 100, the ride height sensors 114B, 114D associated with the passenger side of the vehicle 100, etc.). In some examples, the sensor evaluation circuitry 102 can determine if the vehicle 100 is in an operating condition to evaluate the ride height sensors 114A, 114B, 114C, 114D. For example, the sensor evaluation circuitry 102 can determine if the vehicle 100 is moving at a constant speed (e.g., not accelerating, not decelerating, etc.). In some examples, if the sensor evaluation circuitry 102 determines that discrepancies exist between the outputs of a ride height sensor (e.g., one of the ride height sensors 114A, 114B, 114C, 114D, etc.) and the output of a cross-axle ride height sensor and the output of a longitudinally aligned ride height sensor, the sensor evaluation circuitry 102 can identify that the ride height sensor causing the detected discrepancy.

The memory 116 is memory associated with the vehicle 100 and/or a user thereof. In some examples, the memory 116 can be associated with the ECU of the vehicle 100 and/or a user device of a user of the vehicle 100. In some examples, the memory 116 can store one or more discrepancy counters associated with the discrepancies between the ride height sensors 114A, 114B, 114C, 114D identified by the sensor evaluation circuitry 102. For example, the sensor evaluation circuitry 102 can increase a value (e.g., increment, etc.) of a discrepancy counter stored in the memory 116 after identifying a discrepancy in the output(s) of the ride height sensors 114A, 114B, 114C, 114D. In some such examples, the memory 116 can increase discrepancy counter(s) associated with different combinations of the ride height sensors 114A, 114B, 114C, 114D (e.g., a first discrepancy counter associated with the first ride height sensor 114A and the second ride height sensor 114B, a second discrepancy counter associated with the first ride height sensor 114A and the third ride height sensor 114C, etc.). In other examples, the memory 116 can include any suitable number of discrepancy counters (e.g., one discrepancy counter, etc.). In some examples, the discrepancy counters can be reset (e.g., set to zero, etc.) after the vehicle 100 is serviced by a technician and/or in response to a user command.

In some examples, the memory 116 can include one or more discrepancy threshold(s) used by the sensor evaluation circuitry 102. In some examples, the discrepancy threshold(s) can be quantity-based thresholds (e.g., threshold(s) associated with a quantity of the discrepancy counters, etc.) and/or frequency-based thresholds (e.g., threshold(s) associated with a frequency of discrepancies, etc.). In some examples, the discrepancy threshold(s) stored in the memory 116 can be based on the make and model of the vehicle 100, the resolution of the ride height sensors 114A, 114B, 114C, 114D, a type of the ride height sensors 114A, 114B, 114C, 114D, an age of the vehicle 100, an age of the ride height sensors 114A, 114B, 114C, 114D, a user setting, a manufacturer setting, other ones of the threshold(s), and/or a combination thereof. In some examples, if the sensor evaluation circuitry 102 determines that one or more of the discrepancies counters stored in the memory 116 do not satisfy one or more of the corresponding thresholds (e.g., exceed, etc.), the sensor evaluation circuitry 102 can generate an alert for a user of the vehicle 100 and/or set an on-board diagnostic code to assist in the servicing of the vehicle 100.

Figure 2:
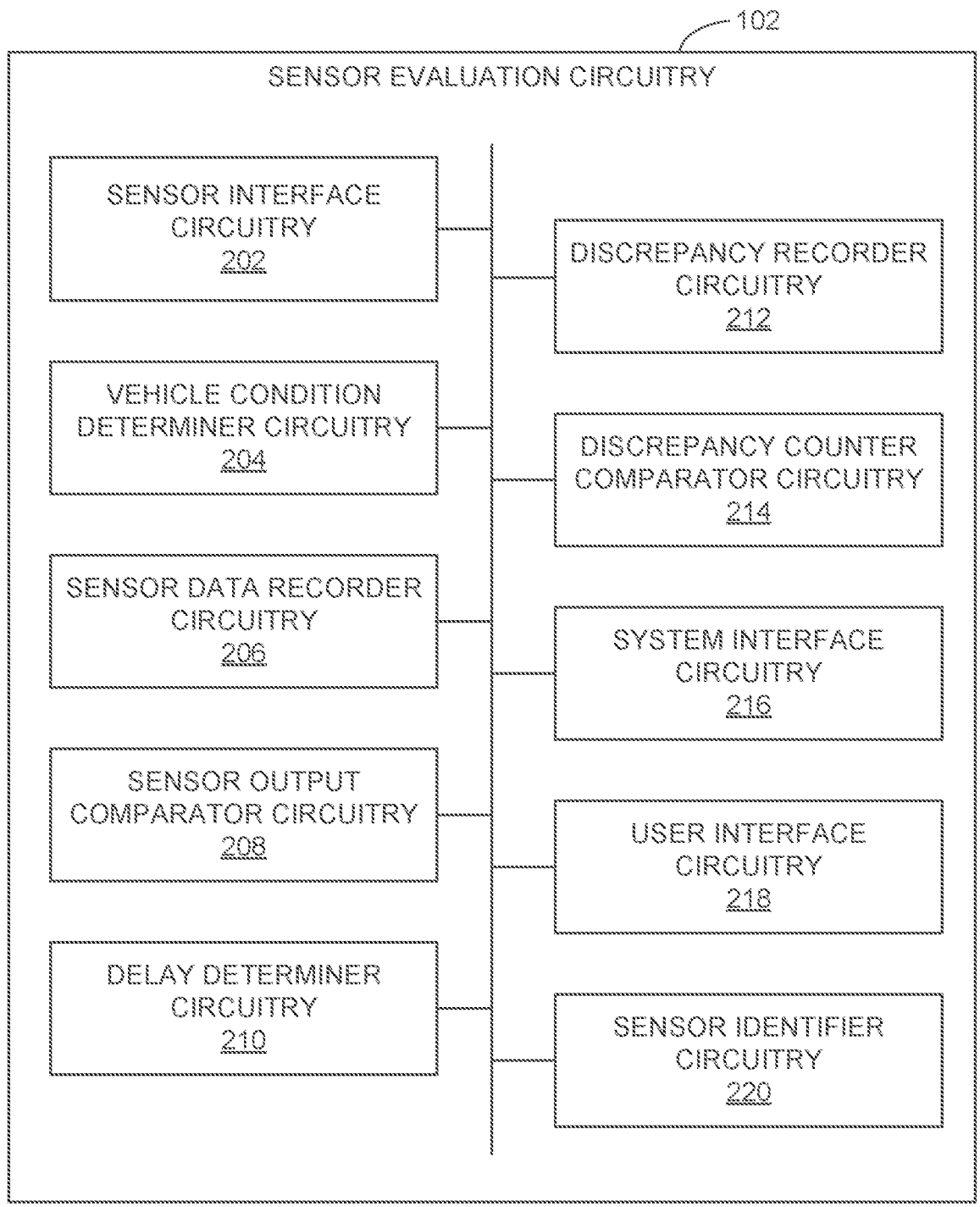
FIG. 2 is a block diagram of the sensor evaluation circuitry of FIG. 1B.

FIG. 2 is a block diagram of an example implementation of the sensor evaluation circuitry 102 of FIG. 1 to identify discrepancies in the output of the ride height sensors 114A, 114B, 114C, 114D. In the illustrated example of FIG. 2, the sensor evaluation circuitry 102 includes example sensor interface circuitry 202, example vehicle condition determiner circuitry 204, example sensor data recorder circuitry 206, example sensor output comparator circuitry 208, example delay determiner circuitry 210, example discrepancy recorder circuitry 212, example threshold comparator circuitry 214, example system interface circuitry 216, example user interface circuitry 218, and sensor identifier circuitry 220. The sensor evaluation circuitry 102 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the sensor evaluation circuitry 102 of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

The sensor interface circuitry 202 accesses sensor data from the sensors 108, 110, 114A, 114B, 114C, 114D of the example vehicle 100. In some examples, the sensor interface circuitry 202 can receive sensor readings (e.g., data, etc.) from other sensors of the vehicle (e.g., other sensors associated with the wheels 104A, 104B, 104C, 104D, sensors associated with the suspension system 103 of the vehicle 100, sensors associated with a steering system of the vehicle 100, etc.). In some examples, the sensor interface circuitry 202 can access the output of the sensors 108, 110, 114A, 114B, 114C, 114D via a controller area network (CAN) bus of the vehicle 100. In some examples, the sensor interface circuitry 202 can transform the received sensor data from a machine-readable format (e.g., a voltage, a current, etc.) to a human-readable format (e.g., a string, a floating-point number, an integer, etc.). In some examples, the sensor interface circuitry 202 is instantiated by programmable circuitry executing sensor interface instructions and/or configured to perform operations such as those represented by the flowcharts of FIGS. 3 and 4.

In some examples, the sensor evaluation circuitry 102 includes means for interfacing with one or more sensors. For example, the means for interfacing with one or more sensors may be implemented by the sensor interface circuitry 202. In some examples, the sensor interface circuitry 202 may be instantiated by programmable circuitry such as the example programmable circuitry 512 of FIG. 5. For instance, the sensor interface circuitry 202 may be instantiated by the example microprocessor 600 of FIG. 6 executing machine executable instructions such as those implemented by at least block 302 of FIG. 3. In some examples, the sensor interface circuitry 202 may be instantiated by hardware logic circuitry, which may be implemented by an ASIC, XPU, or the FPGA circuitry 700 of FIG. 7 configured and/or structured to perform operations corresponding to the machine readable instructions. Additionally or alternatively, the sensor interface circuitry 202 may be instantiated by any other combination of hardware, software, and/or firmware. For example, the sensor interface circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The vehicle condition determiner circuitry 204 determines if the vehicle 100 is in an operating condition to enable the ride height sensors 114A, 114B, 114C, 114D. For example, the vehicle condition determiner circuitry 204 determines if the speed of the vehicle 100 satisfies a speed threshold. For example, the vehicle condition determiner circuitry 204 can compare the speed of the vehicle (e.g., accessed by the sensor interface circuitry 202 from the vehicle speed sensor 108, etc.) to a speed threshold. In some examples, the vehicle condition determiner circuitry 204 can determine if the speed of the vehicle 100 is greater than a speed threshold. Additionally or alternatively, the speed threshold can be based on a resolution of the vehicle speed sensor 108, a switching frequency of the vehicle speed sensor 108, a resolution of one or more of the ride height sensors 114A, 114B, 114C, 114D, and/or a switching frequency of one or more of the ride height sensors 114A, 114B, 114C, 114D. In some examples, the speed threshold can be determined empirically. Additionally or alternatively, the speed threshold can be set by a manufacturer of the vehicle 100, an operator of the vehicle 100, a technician of the vehicle 100, etc. In some examples, the speed threshold is 1 mile per hour (e.g., ~2 kilometers per hour, etc.).

Additionally or alternatively, the vehicle condition determiner circuitry 204 determines if the vehicle 100 is moving at a constant speed (e.g., not undergoing acceleration, not undergoing deceleration, moving at a constant velocity, etc.). For example, the vehicle condition determiner circuitry 204 can determine if the vehicle 100 is undergoing acceleration based on a torque of an engine/motor of the vehicle 100 (e.g., accessed by the sensor interface circuitry 202 from the vehicle sensors 110 during the execution of block 302, etc.). For example, the vehicle condition determiner circuitry 204 can compare a current engine torque to an average engine torque of the vehicle 100 in a previous period (e.g., an immediately preceding time duration, etc.) In some examples, the average engine torque of the vehicle 100 in the previous period can be determined by filtering an engine output torque in an immediately previous time period (e.g., 50 milliseconds, 100 milliseconds, 1 second, 2 seconds, etc.) via an infinite impulse response (IIR) filter. In some such examples, the vehicle condition determiner circuitry 204 can determine a difference between the current engine torque and the average engine torque of the vehicle 100 and compare the difference to an engine torque threshold (e.g., an acceleration threshold, etc.). In some examples, the engine torque threshold can be based on the make and model of the vehicle 100, an engine of the vehicle 100, a weight of the vehicle 100, a resolution of an engine torque sensor, and/or a switching frequency of an engine torque sensor. In some examples, the engine torque threshold can be determined empirically. In some examples, the engine torque threshold is 160 foot-pounds (e.g., ~220 Newton-meter, etc.).

In some examples, the vehicle condition determiner circuitry 204 can determine if the vehicle is undergoing deceleration based on a torque of one or more of the brakes associated with the vehicle 100 (e.g., the brake torque, etc.). For example, the vehicle condition determiner circuitry 204 can determine if the vehicle 100 is undergoing deceleration based on a torque of the brakes of the vehicle 100 (e.g., accessed by the sensor interface circuitry 202 from the vehicle sensors 110, etc.). For example, the vehicle condition determiner circuitry 204 can compare the current brake torque (e.g., a sum of the torque applied by each of the brakes of the vehicle 100, etc.) to an average brake torque of the vehicle 100 in a previous period (e.g., an immediately preceding time duration, etc.). In some examples, the average brake torque of the vehicle 100 in the previous period can be determined by filtering a brake torque in an immediately previous time period (e.g., 50 milliseconds, 100 milliseconds, 1 second, 2 seconds, etc.) via an infinite impulse response filter. In some such examples, the vehicle condition determiner circuitry 204 can determine a difference between the current brake torque and the average brake torque of the vehicle 100 and compare the difference to a brake torque threshold (e.g., a deceleration threshold, etc.).

In some examples, the brake torque threshold can be based on the make and model of the vehicle 100, the brakes of the vehicle 100, a weight of the vehicle 100, a resolution of the brake torque sensor(s), and/or a switching frequency of the brake torque sensor(s). In some examples, the brake torque threshold can be determined empirically. In some examples, the brake torque threshold is 160 foot-pounds (e.g., ~220 Newton-meter, etc.). In some examples, the vehicle condition determiner circuitry 204 is instantiated by programmable circuitry executing vehicle condition determiner instructions and/or configured to perform operations such as those represented by the flowcharts of FIGS. 3 and 4.

In some examples, the sensor evaluation circuitry 102 includes means for determining a condition of a vehicle. For example, the means for determining a condition of a vehicle may be implemented by the vehicle condition determiner circuitry 204. In some examples, the vehicle condition determiner circuitry 204 may be instantiated by programmable circuitry such as the example programmable circuitry 512 of FIG. 5. For instance, the vehicle condition determiner circuitry 204 may be instantiated by the example microprocessor 600 of FIG. 6 executing machine executable instructions such as those implemented by at least blocks 304, 306 of FIG. 3. In some examples, the vehicle condition determiner circuitry 204 may be instantiated by hardware logic circuitry, which may be implemented by an ASIC, XPU, or the FPGA circuitry 700 of FIG. 7 configured and/or structured to perform operations corresponding to the machine readable instructions. Additionally or alternatively, the vehicle condition determiner circuitry 204 may be instantiated by any other combination of hardware, software, and/or firmware. For example, the vehicle condition determiner circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The sensor data recorder circuitry 206 records the outputs of the ride height sensors 114A, 114B, 114C, 114D. For example, the sensor data recorder circuitry 206 can record the output of the ride height sensors 114A, 114B, 114C, 114D as a machine-readable output (e.g., a voltage, a current, etc.) and/or as a human-readable output (e.g., a distance, etc.) in the memory 116. In some examples, the sensor data recorder circuitry 206 can record the output of the ride height sensors 114A, 114B, 114C, 114D as a data structure (e.g., a vector, a matrix, etc.) with an associated time stamp. In some such examples, the time stamp can be a relative time (e.g., a time since the ignition of the vehicle, a time since the recording of the first sensor output, etc.). In other examples, the time stamp can be an absolute time (e.g., a date and time, etc.). In some examples, the sensor data recorder circuitry 206 can record the output of each of the ride height sensors 114A, 114B, 114C, 114D continuously based on the switching frequency of the ride height sensors 114A, 114B, 114C, 114D, based on a capacity of the memory 116, a user setting, and/or a manufacturer setting. In some examples, the sensor data recorder circuitry 206 can record the output of the sensors every 20 milliseconds.

Additionally or alternatively, the sensor data recorder circuitry 206 can record the peak-to-peak value of the output of the first ride height sensor 114A. For example, the sensor data recorder circuitry 206 can determine the peak-to-peak value (e.g., a difference between a maximum output of the first ride height sensor 114A and a minimum output of the first ride height sensor 114A, etc.) during a period. In some such examples, the length of the period can be based on the switching frequency of the ride height sensors 114A, 114B, 114C, 114D, based on a capacity of the memory 116, a user setting, and/or a manufacturer setting. In some examples, the sensor data recorder circuitry 206 is instantiated by programmable circuitry executing sensor data recorder instructions and/or configured to perform operations such as those represented by the flowcharts of FIGS. 3 and 4.

In some examples, the sensor evaluation circuitry 102 includes means for recording sensor data. For example, the means for recording sensor data may be implemented by the sensor data recorder circuitry 206. In some examples, the sensor data recorder circuitry 206 may be instantiated by programmable circuitry such as the example programmable circuitry 512 of FIG. 5. For instance, the sensor data recorder circuitry 206 may be instantiated by the example microprocessor 600 of FIG. 6 executing machine executable instructions such as those implemented by at least blocks 308, 310, 316 of FIG. 3. In some examples, the sensor data recorder circuitry 206 may be instantiated by hardware logic circuitry, which may be implemented by an ASIC, XPU, or the FPGA circuitry 700 of FIG. 7 configured and/or structured to perform operations corresponding to the machine readable instructions. Additionally or alternatively, the sensor data recorder circuitry 206 may be instantiated by any other combination of hardware, software, and/or firmware. For example, the sensor data recorder circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The sensor output comparator circuitry 208 determines if the difference between the outputs of ones of the ride height sensors 114A, 114B, 114C, 114D satisfies a sensor output threshold. For example, the sensor output comparator circuitry 208 can determine the difference as an absolute value of the difference between ones of the ride height sensors 114A, 114B, 114C, 114D. Additionally or alternatively, the sensor output comparator circuitry 208 can determine the percentage difference between ones of the ride height sensors 114A, 114B, 114C, 114D. In some such examples, the sensor output comparator circuitry 208 can determine the percentage difference as an absolute value of the ratio of the difference between the outputs to a first one of the outputs.

In some examples, the sensor output comparator circuitry 208 determines if the determined difference(s) between the outputs satisfies one or more sensor output threshold(s). For example, the sensor output comparator circuitry 208 can compare the difference between the first ride height sensor 114A and the output of the second ride height sensor 114B to a first sensor output threshold. In some examples, the first sensor output threshold (e.g., a cross-axle discrepancy threshold, etc.) can be based on a percentage of the ride height of the vehicle 100 at curb weight, a percentage of the total travel of one or more of the suspension elements 112A, 112B, 112C, 112D, a user setting, and/or a manufacturer setting. Additionally or alternatively, the first sensor output threshold can be a percentage error (e.g., 200% error, 100% error, etc.) and/or a displacement value (e.g., 20 millimeters, 30 millimeters, etc.).

Similarly, the sensor output comparator circuitry 208 can compare the difference between the first ride height sensor 114A and the output of the second ride height sensor 114C to a second sensor output threshold. In some examples, the second sensor output threshold (e.g., the longitudinally aligned discrepancy threshold, etc.) can be based on a percentage of the ride height of the vehicle 100 at curb weight, a percentage of the total travel of one or more of the suspension elements 112A, 112B, 112C, 112D, a user setting, and/or a manufacturer setting. Additionally or alternatively, the first sensor output threshold can be a percentage error (e.g., 200% error, 100% error, etc.) and/or a displacement value (e.g., 20 millimeters, 30 millimeters, etc.). In some examples, the second sensor output threshold is less than the first sensor output threshold due to the expected greater correlation between longitudinally aligned ride height sensors than the correlation between cross-axle ride height sensors (e.g., longitudinally aligned wheels are more likely to encounter common terrain than cross-axle wheels, etc.). In some examples, the sensor output comparator circuitry 208 is instantiated by programmable circuitry executing sensor output comparator instructions and/or configured to perform operations such as those represented by the flowcharts of FIGS. 3 and 4.

In some examples, the sensor evaluation circuitry 102 includes means for determining a difference between sensor outputs. For example, the means for determining may be implemented by the sensor output comparator circuitry 208. In some examples, the sensor output comparator circuitry 208 may be instantiated by programmable circuitry such as the example programmable circuitry 512 of FIG. 5. For instance, the sensor output comparator circuitry 208 may be instantiated by the example microprocessor 600 of FIG. 6 executing machine executable instructions such as those implemented by at least blocks 312, 317, 318 of FIG. 3. In some examples, the sensor output comparator circuitry 208 may be instantiated by hardware logic circuitry, which may be implemented by an ASIC, XPU, or the FPGA circuitry 700 of FIG. 7 configured and/or structured to perform operations corresponding to the machine readable instructions. Additionally or alternatively, the sensor output comparator circuitry be instantiated by any other combination of hardware, software, and/or firmware. For example, the sensor output comparator circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The delay determiner circuitry 210 determines a delay between when the terrain is encountered by the front wheels of the vehicle 100 (e.g., the wheels 104A, 104B, etc.) and the rear wheels of the vehicle 100 (e.g., the wheels 104C, 104D, etc.). In some examples, the delay determiner circuitry 210 can determine the delay based on the wheelbase 118 and the vehicle speed (e.g., accessed by the sensor interface circuitry 202 from the vehicle speed sensor 108, etc.). In some examples, the delay determiner circuitry 210 can determine the time (e.g., a second time) at which the third wheel 104C is in the same position that the first wheel 104A was at a first time. In some examples, the delay determiner circuitry 210 can determine the delay and/or a second time based on the ratio of the wheelbase to the speed of the vehicle 100. In some examples, the delay determiner circuitry 210 is instantiated by programmable circuitry executing delay determiner instructions and/or configured to perform operations such as those represented by the flowcharts of FIGS. 3 and 4.

In some examples, the sensor evaluation circuitry 102 includes means for determining a delay. For example, the means for determining a delay may be implemented by the delay determiner circuitry 210. In some examples, the delay determiner circuitry 210 may be instantiated by programmable circuitry such as the example programmable circuitry 512 of FIG. 5. For instance, the delay determiner circuitry 210 may be instantiated by the example microprocessor 600 of FIG. 6 executing machine executable instructions such as those implemented by at least block 314 of FIG. 3. In some examples, the delay determiner circuitry 210 may be instantiated by hardware logic circuitry, which may be implemented by an ASIC, XPU, or the FPGA circuitry 700 of FIG. 7 configured and/or structured to perform operations corresponding to the machine readable instructions. Additionally or alternatively, the delay determiner circuitry 210 may be instantiated by any other combination of hardware, software, and/or firmware. For example, the delay determiner circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The discrepancy recorder circuitry 212 records discrepancies in the memory 116. For example, the discrepancy recorder circuitry 212 can increment one or more discrepancy counters (e.g., discrepancy counters associated with one or more sets of the ride height sensors 114A, 114B, 114C, 114D, etc.). In some examples, the discrepancy recorder circuitry 212 can create and/or modify a data structure and/or a scalar value stored in the memory. In some such examples, the discrepancy recorder circuitry 212 can increase the discrepancy counter by different values based on the magnitude of the discrepancy (e.g., comparatively larger discrepancies increase the discrepancy counter by more than one, etc.). In some examples, the discrepancy recorder circuitry 212 is instantiated by programmable circuitry executing discrepancy recorder instructions and/or configured to perform operations such as those represented by the flowcharts of FIGS. 3 and 4.

In some examples, the sensor evaluation circuitry 102 includes means for recording discrepancies. For example, the means for recording discrepancies may be implemented by discrepancy recorder circuitry 212. In some examples, the discrepancy recorder circuitry 212 may be instantiated by programmable circuitry such as the example programmable circuitry 512 of FIG. 5. For instance, the discrepancy recorder circuitry 212 may be instantiated by the example microprocessor 600 of FIG. 6 executing machine executable instructions such as those implemented by at least blocks 404, 413, 414 of FIG. 4. In some examples, the discrepancy recorder circuitry 212 may be instantiated by hardware logic circuitry, which may be implemented by an ASIC, XPU, or the FPGA circuitry 700 of FIG. 7 configured and/or structured to perform operations corresponding to the machine readable instructions. Additionally or alternatively, the discrepancy recorder circuitry 212 may be instantiated by any other combination of hardware, software, and/or firmware. For example, the discrepancy recorder circuitry 212 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The discrepancy threshold comparator circuitry 214 determines if one or more of the discrepancy counter(s) stored in the memory 116 satisfy one or more discrepancy threshold(s). For example, the discrepancy threshold comparator circuitry 214 can compare the discrepancy counter in the memory 116 to one or more quantity-based discrepancy threshold(s). Additionally or alternatively, the discrepancy threshold comparator circuitry 214 can determine one or more frequencies of discrepancies (e.g., one or more discrepancy frequencies, etc.) based on the discrepancy threshold comparator circuitry 214. For example, the discrepancy threshold comparator circuitry 214 can determine a number of discrepancies per day, a number of discrepancies per driving hour, etc. In some such examples, the discrepancy threshold comparator circuitry 214 can compare the frequencies of discrepancies to one or more frequency-based discrepancy threshold(s).

In some examples, the discrepancy threshold comparator circuitry 214 can use different discrepancy thresholds based on the set of ride height sensors 114A, 114B, 114C, 114D. For example, the discrepancy threshold comparator circuitry 214 can use different discrepancy threshold(s) for cross-axle ride height sensors and longitudinally aligned ride height sensors. In some such examples, the discrepancy threshold(s) associated with sets of cross-axle ride height sensors is greater than the discrepancy threshold(s) associated with longitudinally aligned ride height sensors. In some examples, the discrepancy threshold comparator circuitry 214 is instantiated by programmable circuitry executing discrepancy threshold comparator instructions and/or configured to perform operations such as those represented by the flowcharts of FIGS. 3 and 4.

In some examples, the sensor evaluation circuitry 102 includes means for comparing a discrepancy counter and/or frequency to a threshold. For example, the means for comparing a discrepancy counter and/or frequency to a threshold may be implemented by the discrepancy threshold comparator circuitry 214. In some examples, the discrepancy threshold comparator circuitry 214 may be instantiated by programmable circuitry such as the example programmable circuitry 512 of FIG. 5. For instance, the discrepancy threshold comparator circuitry 214 may be instantiated by the example microprocessor 600 of FIG. 6 executing machine executable instructions such as those implemented by at least blocks 406, 410, 416, 420 of FIG. 4. In some examples, the discrepancy threshold comparator circuitry 214 may be instantiated by hardware logic circuitry, which may be implemented by an ASIC, XPU, or the FPGA circuitry 700 of FIG. 7 configured and/or structured to perform operations corresponding to the machine readable instructions. Additionally or alternatively, the discrepancy threshold comparator circuitry 214 may be instantiated by any other combination of hardware, software, and/or firmware. For example, the discrepancy threshold comparator circuitry 214 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The system interface circuitry 216 sets diagnostic codes that assist a technician in the servicing of the vehicle 100. For example, the system interface circuitry 216 can set an on-board diagnostic code indicating a discrepancy between the outputs of one or more of the ride height sensors 114A, 114B, 114C, 114D. For example, the system interface circuitry 216 can set an on-board diagnostic code in a memory (e.g., memory 116, etc.) associated with the vehicle 100. In some examples, the system interface circuitry 216 can set a diagnostic trouble code (DTC) (e.g., an OBD-II parameter ID, etc.) that enables a technician to identify a potential issue with one or more of the ride height sensors 114A, 114B, 114C, 114D, etc. In some examples, the system interface circuitry 216 is instantiated by programmable circuitry executing system interface instructions and/or configured to perform operations such as those represented by the flowcharts of FIGS. 3 and 4.

In some examples, the sensor evaluation circuitry 102 includes means for interfacing with the systems of a vehicle. For example, the means for interfacing with the systems of a vehicle may be implemented by the system interface circuitry 216. In some examples, the system interface circuitry 216 may be instantiated by programmable circuitry such as the example programmable circuitry 512 of FIG. 5. For instance, the system interface circuitry 216 may be instantiated by the example microprocessor 600 of FIG. 6 executing machine executable instructions such as those implemented by at least blocks 408, 418 of FIG. 4. In some examples, the system interface circuitry 216 may be instantiated by hardware logic circuitry, which may be implemented by an ASIC, XPU, or the FPGA circuitry 700 of FIG. 7 configured and/or structured to perform operations corresponding to the machine readable instructions. Additionally or alternatively, the system interface circuitry 216 may be instantiated by any other combination of hardware, software, and/or firmware. For example, the system interface circuitry 216 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The user interface circuitry 218 presents alert(s) indicating a discrepancy between one or more sets of the ride height sensors 114A, 114B, 114C, 114D via the user interface 106. For example, the user interface circuitry 218 can generate and present a visual alert (e.g., a text indication, a dash light, etc.) to the user via the user interface 106. Additionally or alternatively, the user interface circuitry 218 can generate and present an audio alert and/or tactile alert to the user via the user interface 106. In some examples, the alert can include an indication that one or more of the ride height sensors 114A, 114B, 114C, 114D are to be serviced. In some examples, the user interface circuitry 218 is instantiated by programmable circuitry executing user interface instructions and/or configured to perform operations such as those represented by the flowcharts of FIGS. 3 and 4.

In some examples, the sensor evaluation circuitry 102 includes means for interfacing with a user. For example, the means for interfacing with a user may be implemented by the user interface circuitry 218. In some examples, the user interface circuitry 218 may be instantiated by programmable circuitry such as the example programmable circuitry 512 of FIG. 5. For instance, the user interface circuitry 218 may be instantiated by the example microprocessor 600 of FIG. 6 executing machine executable instructions such as those implemented by at least blocks 412, 422 of FIG. 4. In some examples, the user interface circuitry 218 may be instantiated by hardware logic circuitry, which may be implemented by an ASIC, XPU, or the FPGA circuitry 700 of FIG. 7 configured and/or structured to perform operations corresponding to the machine readable instructions. Additionally or alternatively, the user interface circuitry 218 may be instantiated by any other combination of hardware, software, and/or firmware. For example, the user interface circuitry 218 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The sensor identifier circuitry 220 determines if one or more of the ride height sensors 114A, 114B, 114C, 114D are associated with the discrepancy based on the discrepancy counters in the memory 116. For example, the sensor identifier circuitry 220 can identify such a ride height sensor based on a ride height sensor being associated with multiple discrepancy counters that satisfy one or more threshold(s). For example, if a discrepancy counter associated with discrepancies between the outputs of the first ride height sensor 114A and the second ride height sensor 114B satisfies a threshold and a discrepancy counter associated with discrepancies between the outputs of the first ride height sensor 114A and the third ride height sensor 114C satisfies a threshold, the sensor identifier circuitry 220 can identify that the first ride height sensor 114A is potentially causing the discrepancy. In some such examples, the sensor identifier circuitry 220 can similarly identify one or more of the ride height sensors 114B, 114C, 114D as potentially causing the discrepancy. In some examples, the sensor identifier circuitry 220 is instantiated by programmable circuitry executing sensor identifier instructions and/or configured to perform operations such as those represented by the flowcharts of FIGS. 3 and 4.

In some examples, the sensor evaluation circuitry 102 includes means for identifying a sensor. For example, the means for identifying a sensor may be implemented by the sensor identifier circuitry 220. In some examples, the sensor identifier circuitry 220 may be instantiated by programmable circuitry such as the example programmable circuitry 512 of FIG. 5. For instance, the sensor identifier circuitry 220 may be instantiated by the example microprocessor 600 of FIG. 6 executing machine executable instructions such as those implemented by at least blocks 424, 426 of FIG. 3. In some examples, the sensor identifier circuitry 220 may be instantiated by hardware logic circuitry, which may be implemented by an ASIC, XPU, or the FPGA circuitry 700 of FIG. 7 configured and/or structured to perform operations corresponding to the machine readable instructions. Additionally or alternatively, the sensor identifier circuitry 220 may be instantiated by any other combination of hardware, software, and/or firmware. For example, the sensor identifier circuitry 220 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

While an example manner of implementing the sensor evaluation circuitry of FIG. 1 is illustrated in FIG. 2, one or more of the elements, processes, and/or devices illustrated in FIG. 2 may be combined, divided, re-arranged, omitted, eliminated, and/or implemented in any other way. Further, the example sensor interface circuitry 202, the example vehicle condition determiner circuitry 204, the example sensor data recorder circuitry 206, the example sensor output comparator circuitry 208, the example delay determiner circuitry 210, the example discrepancy recorder circuitry 212, the example threshold comparator circuitry 214, the example system interface circuitry 216, the example user interface circuitry 218, the example sensor identifier circuitry 220, and/or, more generally, the example sensor evaluation circuitry 102 of FIG. 2, may be implemented by hardware alone or by hardware in combination with software and/or firmware. Thus, for example, any of the example sensor interface circuitry 202, the example vehicle condition determiner circuitry 204, the example sensor data recorder circuitry 206, the example sensor output comparator circuitry 208, the example delay determiner circuitry 210, the example discrepancy recorder circuitry 212, the example threshold comparator circuitry 214, the example system interface circuitry 216, the example user interface circuitry 218, the example sensor identifier circuitry 220, and/or, more generally, the example sensor evaluation circuitry 102, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example sensor evaluation circuitry 102 of FIG. 2 may include one or more elements, processes, and/or devices in addition to, or instead of, those illustrated in FIG. 2, and/or may include more than one of any or all of the illustrated elements, processes and devices.

Figure 3:
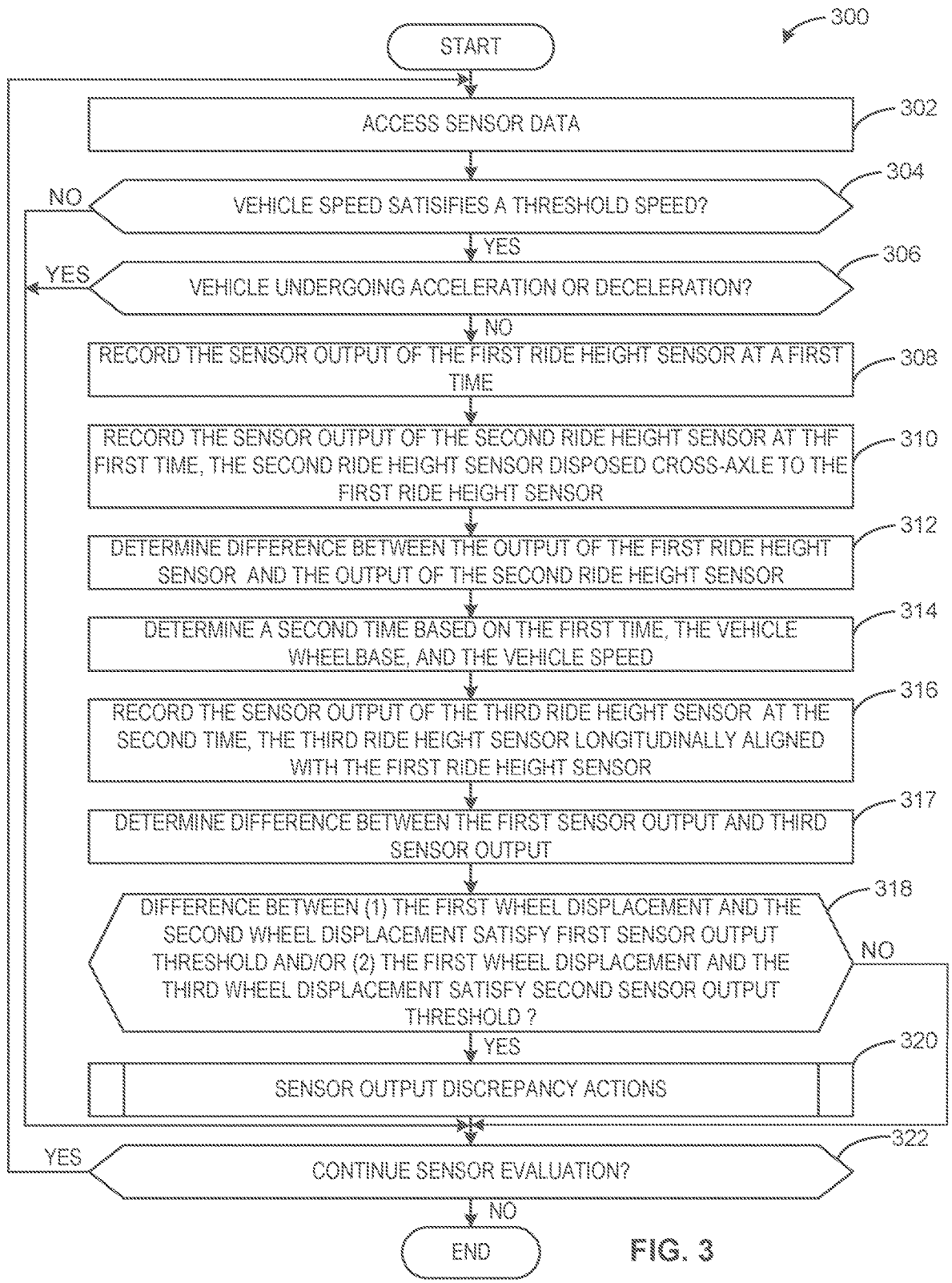
FIGS. 3 and 4 are flowcharts representative of example machine readable instructions and/or example operations that may be executed, instantiated, and/or performed by example programmable circuitry to implement the sensor evaluation circuitry of FIG. 2.
Figure 4:
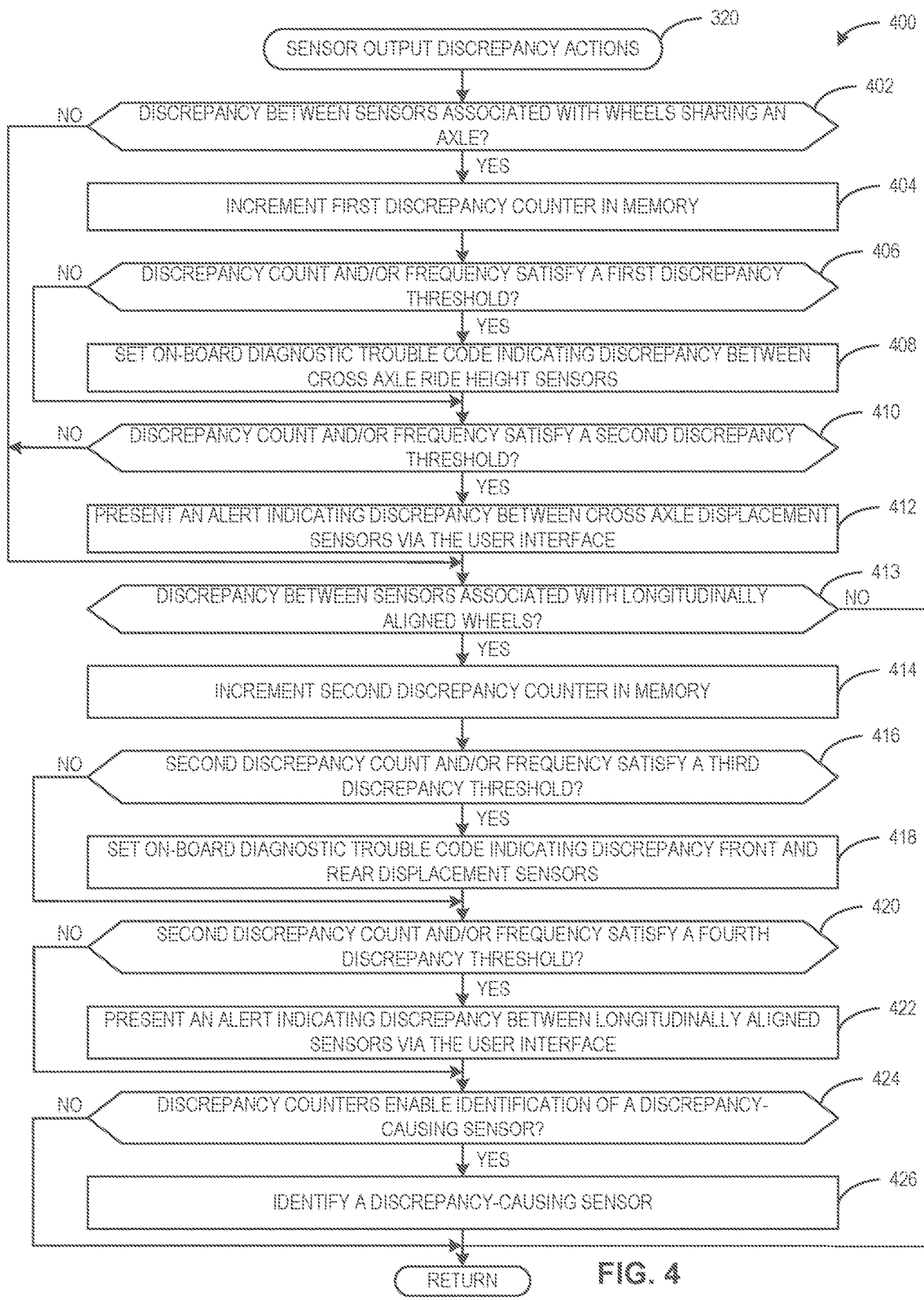

Flowchart(s) representative of example machine readable instructions, which may be executed by programmable circuitry to implement and/or instantiate the sensor evaluation circuitry 102 of FIG. 2 and/or representative of example operations which may be performed by programmable circuitry to implement and/or instantiate the sensor evaluation circuitry 102 of FIG. 2, are shown in FIGS. 3 and 4. The machine readable instructions may be one or more executable programs or portion(s) of one or more executable programs for execution by programmable circuitry such as the programmable circuitry 512 shown in the example programmable circuitry platform 500 discussed below in connection with FIG. 5 and/or may be one or more function(s) or portion(s) of functions to be performed by the example programmable circuitry (e.g., an FPGA) discussed below in connection with FIGS. 6 and/or 7. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 3 and 4, many other methods of implementing the example sensor evaluation circuitry may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 3 and 4 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 3 is a flowchart representative of example machine readable instructions and/or example operations 300 that may be executed, instantiated, and/or performed by programmable circuitry to identify discrepancies between the outputs of one or more of the ride height sensors 114A, 114B, 114C, 114D of the vehicle 100 of FIGS. 1A and 1B. The example machine-readable instructions and/or the example operations 300 of FIG. 3 begin at block 302, at which the sensor interface circuitry 202 accesses sensor data from the sensors 108, 110, 114A, 114B, 114C, 114D of the example vehicle 100. In some examples, the sensor interface circuitry 202 can receive sensor readings (e.g., data, etc.) from other sensors of the vehicle (e.g., other sensors associated with the wheels 104A, 104B, 104C, 104D, sensors associated with the suspension system 103 of the vehicle 100, sensors associated with a steering system of the vehicle 100, etc.). In some examples, the sensor interface circuitry 202 can access the output of the sensors 108, 110, 114A, 114B, 114C, 114D via a controller area network (CAN) bus of the vehicle 100. In some examples, the sensor interface circuitry 202 can transform the received sensor data from a machine-readable format (e.g., a voltage, a current, etc.) to a human-readable format (e.g., a string, a floating-point number, an integer, etc.).

At block 304, the vehicle condition determiner circuitry 204 determines if a speed of the vehicle 100 satisfies a speed threshold. For example, the vehicle condition determiner circuitry 204 can compare a speed of the vehicle (e.g., accessed by the sensor interface circuitry 202 from the vehicle speed sensor 108 during the execution of block 302, etc.) to a speed threshold. If the vehicle condition determiner circuitry 204 determines the speed of the vehicle 100 satisfies the threshold speed, the operations 300 advance to block 306. If the vehicle condition determiner circuitry 204 determines the speed of the vehicle 100 does not satisfy the threshold speed, the operations 300 advance to block 322.

At block 306, the vehicle condition determiner circuitry 204 determines if the vehicle 100 is undergoing acceleration or deceleration. For example, the vehicle condition determiner circuitry 204 can determine if the vehicle 100 is undergoing acceleration based on a torque of an engine/motor of the vehicle 100 (e.g., accessed by the sensor interface circuitry 202 from the vehicle sensors 110 during the execution of block 302, etc.). For example, the vehicle condition determiner circuitry 204 can compare a current engine torque to an average engine torque of the vehicle 100 in a previous period (e.g., an immediately proceeding time duration, etc.) In some such examples, the vehicle condition determiner circuitry 204 can determine a difference between the current engine torque and the average engine torque of the vehicle 100 and compare the difference to an engine torque threshold (e.g., an acceleration threshold, etc.).

Additionally or alternatively, the vehicle condition determiner circuitry 204 can determine if the vehicle is undergoing deceleration based on a torque of one or more of the brakes associated with the vehicle 100. For example, the vehicle condition determiner circuitry 204 can determine if the vehicle 100 is undergoing deceleration based on a torque of the brakes of the vehicle 100 (e.g., accessed by the sensor interface circuitry 202 from the vehicle sensors 110 during the execution of block 302, etc.). For example, the vehicle condition determiner circuitry 204 can compare the current brake torque (e.g., a sum of the torque applied by each of the brakes of the vehicle 100, etc.) to an average brake torque of the vehicle 100 in a previous period (e.g., an immediately preceding time duration, etc.). In some such examples, the vehicle condition determiner circuitry 204 can determine a difference between the current brake torque and the average brake torque of the vehicle 100 and compare the difference to a brake torque threshold (e.g., a deceleration threshold, etc.). If the vehicle condition determiner circuitry 204 determines that the vehicle 100 is not undergoing acceleration or deceleration, the operations 300 advance to block 308. If the vehicle condition determiner circuitry 204 determines that the vehicle 100 is not undergoing acceleration or deceleration, the operations 300 advance to block 322.

At block 308, the sensor data recorder circuitry 206 records the sensor output of the first ride height sensor 114A at a first time. For example, the sensor data recorder circuitry 206 can record the output of the first ride height sensor 114A as a machine-readable output and/or as a human-readable output in the memory 116. In some examples, the sensor data recorder circuitry 206 can record the peak-to-peak value of the output of the first ride height sensor 114A. For example, the sensor data recorder circuitry 206 can determine the peak-to-peak value (e.g., a difference between a maximum output of the first ride height sensor 114A and a minimum output of the first ride height sensor 114A, etc.) during a first period beginning at the first time (e.g., a 500 millisecond duration, a one second duration, a 5 second duration, etc.). In some examples, the sensor data recorder circuitry 206 can record the output of the first ride height sensor 114A as a data structure (e.g., a vector, a matrix, etc.) with an associated time stamp.

At block 310, the sensor data recorder circuitry 206 records the sensor output of the second ride height sensor 114B at the first time. In some examples, the sensor data recorder circuitry 206 records the output of the second ride height sensor 114B in a manner similar to the output of the first ride height sensor 114A recorded during the execution of block 308. In other examples, the sensor data recorder circuitry 206 can record the sensor output in any other suitable manner.

At block 312, the sensor output comparator circuitry 208 determines the difference between the output of the first ride height sensor 114A and the output of the second ride height sensor 114B. For example, the sensor output comparator circuitry 208 determines the absolute value of the difference between the output of the first ride height sensor 114A and the output of the second ride height sensor 114B. Additionally or alternatively, the sensor output comparator circuitry 208 can determine the percentage difference between the output of the first ride height sensor 114A and the output of the second ride height sensor 114B.

At block 314, the delay determiner circuitry 210 determines a second time based on the first time, the wheelbase 118, and the vehicle speed. For example, the delay determiner circuitry 210 can determine the delay between when the terrain is encountered by the front wheel and the first ride height sensor 114A and when the terrain is encountered by the rear wheel and the third ride height sensor 114C based on the wheelbase 118 and the vehicle speed (e.g., accessed by the sensor interface circuitry 202 from the vehicle speed sensor 108 during the execution of block 302, etc.). That is, the delay determiner circuitry 210 can determine the time (e.g., the second time, etc.) at which the third wheel 104C is in the same position that the first wheel 104A was at the first time. In some examples, the delay determiner circuitry 210 can determine the second time based on the ratio of the wheelbase to the speed of the vehicle 100.

At block 316, the sensor data recorder circuitry 206 records the sensor output of the third ride height sensor 114C at the second time. For example, the sensor data recorder circuitry 206 can record the output of the third ride height sensor 114C in a manner similar to the output of the first ride height sensor 114A recorded during the execution of block 308. In other examples, the sensor data recorder circuitry 206 can record the sensor output in any other suitable manner.

At block 317, the sensor output comparator circuitry 208 determines the difference between the output of the first ride height sensor 114A and the output of the third ride height sensor 114C. For example, the sensor output comparator circuitry 208 can determine the absolute value of the difference between the output of the first ride height sensor 114A and the output of the third ride height sensor 114C. Additionally or alternatively, the sensor output comparator circuitry 208 can determine the percentage difference between the output of the first ride height sensor 114A and the output of the third ride height sensor 114C.

At block 318, the sensor output comparator circuitry 208 determines if (1) the difference between the output of the first ride height sensor 114A and the output of the second ride height sensor 114B satisfies a first sensor output threshold and/or (2) the difference between the output of the first ride height sensor 114A and the output of the third ride height sensor 114C satisfies a second sensor output threshold. In some examples, the first sensor output threshold (e.g., a cross-axle sensor output threshold, etc.) and/or the second sensor output threshold (e.g., a longitudinal sensor output threshold, etc.) can be based on a percentage of the ride height of the vehicle 100 at curb weight, a percentage of the total travel of one or more of the suspension elements 112A, 112B, 112C, 112D, a user setting, and/or a manufacturer setting. Additionally or alternatively, the first sensor output threshold and/or second sensor output threshold can be a percentage error (e.g., 200% error, 100% error, etc.) and/or a displacement value (e.g., 20 millimeters, 30 millimeters, etc.). In some examples, the second sensor output threshold is lower than the first sensor output threshold because the correlation between longitudinally aligned ride height is typically higher than the correlation between cross-axle ride height. If the sensor output comparator circuitry 208 determines (1) the difference between the first ride height sensor 114A and the output of the second ride height sensor 114B satisfies the first sensor output threshold and/or (2) the difference between the first ride height sensor 114A and the output of the third ride height sensor 114C satisfies the second sensor output threshold, the operations advance to block 320. If the sensor output comparator circuitry 208 determines that (1) the difference between the first ride height sensor 114A and the output of the second ride height sensor 114B does not satisfy the first sensor output threshold and (2) the difference between the first ride height sensor 114A and the output of the third ride height sensor 114C does not satisfy the second sensor output threshold, the operations 300 advance to block 322.

At block 320, the discrepancy recorder circuitry 212, the discrepancy threshold comparator circuitry 214, the system interface circuitry 216, and the user interface circuitry 218 perform sensor output discrepancy actions. Example operations to execute block 320 are described below in conjunction with FIG. 4. At block 322, the vehicle condition determiner circuitry 204 determines if the evaluation of the ride height sensors 114A, 114B, 114C, 114D is to continue. For example, the vehicle condition determiner circuitry 204 can determine to continue the evaluation of the ride height sensors 114A, 114B, 114C, 114D based on the status of the vehicle 100 (e.g., the vehicle 100 is moving, the ignition of the vehicle 100, etc.). In other examples, the vehicle condition determiner circuitry 204 can determine whether to continue the evaluation of the ride height sensors 114A, 114B, 114C, 114D based on any other suitable information. If the vehicle condition determiner circuitry 204 determines to continue sensor evaluation, the operations 300 return to block 302. If the vehicle condition determiner circuitry 204 determines to not continue sensor evaluation, the operations 300 end.

FIG. 4 is a flowchart representative of example machine readable instructions and/or example operations 400 that may be executed, instantiated, and/or performed by programmable circuitry to execute block 320 of FIG. 3 and/or to undertake actions after detecting a discrepancy between the outputs of the ride height sensors 114A, 114B, 114C, 114D. The example machine-readable instructions and/or the example operations 400 of FIG. 4 begin at block 402, at which the discrepancy recorder circuitry 212 determines if the detected sensor discrepancy is between sensors associated with wheels sharing an axle. For example, the discrepancy recorder circuitry 212 can determine if the discrepancy was detected in the outputs of the sensors associated with the wheels 104A, 104B (e.g., the front wheels, etc.) of the vehicle 100 (e.g., the first ride height sensor 114A, the second ride height sensor 114B, etc.) and/or the detected in the outputs of the sensors associated with the wheels 104C, 104D (e.g., the rear wheels, etc.) of the vehicle 100 (e.g., the third ride height sensor 114C, the fourth ride height sensor 114D, etc.). If the discrepancy recorder circuitry 212 determines the detected sensor discrepancy is between sensors associated with wheels sharing an axle, the operations 400 advance to block 404. If the discrepancy recorder circuitry 212 determines the detected sensor discrepancy is not between sensors associated with wheels sharing an axle, the operations 400 advance to block 413.

At block 404, the discrepancy recorder circuitry 212 increments a first discrepancy counter in the memory 116. For example, the discrepancy recorder circuitry 212 can increment a discrepancy counter associated with cross-axle sensors (e.g., a cross-axle discrepancy counter, etc.) and/or a specific set of sensors based on the sensors associated with the discrepancy (e.g., a discrepancy encounter with the ride height sensors 114A, 114B, etc.). In some examples, the discrepancy recorder circuitry 212 can increase a value of a field of a data structure and/or a scalar value stored in the memory. In some such examples, the discrepancy recorder circuitry 212 can increase the discrepancy counter by different values based on the magnitude of the discrepancy (e.g., comparatively larger discrepancies increase the discrepancy counter by more than one, etc.).

At block 406, the discrepancy threshold comparator circuitry 214 determines if the discrepancy counter and/or frequency satisfies a first discrepancy threshold. For example, the discrepancy threshold comparator circuitry 214 can compare the first discrepancy counter in the memory 116 to a first discrepancy threshold (e.g., a quantity threshold, etc.). Additionally or alternatively, the discrepancy threshold comparator circuitry 214 can determine a frequency of discrepancies (e.g., a number of discrepancies per day, a number of discrepancies per hour of drive time, a number of discrepancies per minute of drive, time, etc.) based on the first discrepancy counter. In some such examples, the discrepancy threshold comparator circuitry 214 can compare the frequency of discrepancies to a first discrepancy threshold (e.g., a frequency threshold, etc.). If the discrepancy threshold comparator circuitry 214 determines the discrepancy counter and/or the frequency of discrepancies satisfies the first discrepancy threshold, the operations 400 advance to block 408. If the discrepancy threshold comparator circuitry 214 determines the discrepancy counter and/or the frequency of discrepancies does not satisfy the first discrepancy threshold, the operations 400 advance to block 410.

At block 408, the system interface circuitry 216 can set an on-board diagnostic code indicating a discrepancy between cross-axle ride height sensors. For example, the system interface circuitry 216 can set an on-board diagnostic code in a memory (e.g., memory 116, etc.) associated with the vehicle 100. In some examples, the system interface circuitry 216 can set a diagnostic trouble code (DTC) (e.g., an OBD-II parameter ID, etc.) that enables a technician to identify a potential issue with one or more of the ride height sensors 114A, 114B, 114C, 114D, etc.

At block 410, the discrepancy threshold comparator circuitry 214 determines if the discrepancy counter and/or frequency satisfies a second discrepancy threshold. For example, the discrepancy threshold comparator circuitry 214 can compare the first discrepancy counter in the memory 116 to a second discrepancy threshold (e.g., a quantity threshold, etc.). Additionally or alternatively, the discrepancy threshold comparator circuitry 214 can compare the frequency of discrepancies to a second discrepancy threshold (e.g., a frequency threshold, etc.). In some examples, the second discrepancy threshold is greater than the first discrepancy threshold (e.g., the second discrepancy threshold is satisfied by a greater number of thresholds, the second discrepancy threshold is satisfied by a greater frequency of thresholds, etc.). If the discrepancy threshold comparator circuitry 214 determines the discrepancy counter and/or the frequency of discrepancies satisfies the second discrepancy threshold, the operations 400 advance to block 412. If the discrepancy threshold comparator circuitry 214 determines the discrepancy counter and/or the frequency of discrepancies does not satisfy the second discrepancy threshold, the operations 400 advance to block 413.

At block 412, the discrepancy recorder circuitry 212 increments a second discrepancy counter in the memory 116. For example, the discrepancy recorder circuitry 212 can increment a discrepancy counter associated with longitudinally aligned sensors (e.g., a longitudinally aligned sensor discrepancy counter, etc.) and/or a specific set of sensors based on the sensors associated with the discrepancy (e.g., a discrepancy counter with the ride height sensors 114A, 114B, a discrepancy counter with the ride height sensors 114C, 114D, etc.). In some examples, the discrepancy recorder circuitry 212 can increase a value of a data structure and/or a scalar value stored in the memory. In some such examples, the discrepancy recorder circuitry 212 can increase the discrepancy counter by different values based on the magnitude of the discrepancy (e.g., comparatively larger discrepancies increase the discrepancy counter by more than one, etc.).

At block 413, the discrepancy recorder circuitry 212 determines if the detected sensor discrepancy is between sensors associated with longitudinally aligned wheels. For example, the discrepancy recorder circuitry 212 can determine if the discrepancy was detected in the outputs of the sensors associated with the wheels 104A, 104C (e.g., the driver side wheels, etc.) of the vehicle 100 (e.g., the first ride height sensor 114A, the third ride height sensor 114C, etc.) and/or the detected in the outputs of the sensors associated with the wheels 104B, 104D (e.g., the passenger side wheels, etc.) of the vehicle 100 (e.g., the second ride height sensor 114B, the fourth ride height sensor 114D, etc.). If the discrepancy recorder circuitry 212 determines the detected sensor discrepancy is between sensors associated with longitudinally aligned wheels, the operations 400 advance to block 414. If the discrepancy recorder circuitry 212 determines the detected sensor discrepancy is not between sensors associated with longitudinally aligned wheels, the operations 400 end.

At block 414, the user interface circuitry 218 presents an alert indicating a discrepancy between cross-axle ride height displacement sensors via the user interface 106. For example, the user interface circuitry 218 can generate and present a visual alert (e.g., a text indication, a dash light, etc.) to the user via the user interface 106. Additionally or alternatively, the user interface circuitry 218 can generate and present an audio alert and/or tactile alert to the user via the user interface 106. In some examples, the alert can include an indication that one or more of the ride height sensors 114A, 114B, 114C, 114D are to be serviced.

At block 416, the discrepancy threshold comparator circuitry 214 determines if the second discrepancy counter and/or frequency satisfies a third discrepancy threshold. For example, the discrepancy threshold comparator circuitry 214 can compare the second discrepancy counter in the memory 116 to a third discrepancy threshold (e.g., a quantity threshold, etc.). Additionally or alternatively, the discrepancy threshold comparator circuitry 214 can compare the frequency of discrepancies to a third discrepancy threshold (e.g., a frequency threshold, etc.). In some examples, because the correlation between longitudinally aligned sensors is greater than the correlation between cross-axle sensors, the third discrepancy threshold is less than the first discrepancy threshold (e.g., the third discrepancy threshold is satisfied by a lesser number of discrepancies, the third discrepancy threshold is satisfied by a lesser frequency of discrepancies, etc.). If the discrepancy threshold comparator circuitry 214 determines the discrepancy counter and/or the frequency of discrepancies satisfies the third discrepancy threshold, the operations 400 advance to block 418. If the discrepancy threshold comparator circuitry 214 determines the discrepancy counter and/or the frequency of discrepancies does not satisfy the third discrepancy threshold, the operations 400 advance to block 420.

At block 418, the system interface circuitry 216 can set an on-board diagnostic code indicating a discrepancy between longitudinally aligned ride height sensors. For example, the system interface circuitry 216 can set an on-board diagnostic code in a memory (e.g., memory 116, etc.) associated with the vehicle 100. In some examples, the system interface circuitry 216 can set a diagnostic trouble code (DTC) (e.g., an OBD-II parameter ID, etc.) that enables a technician to identify a potential issues with one or more of the ride height sensors 114A, 114B, 114C, 114D, etc.

At block 420, the discrepancy threshold comparator circuitry 214 determines if the discrepancy counter and/or frequency satisfies a fourth discrepancy threshold. For example, the discrepancy threshold comparator circuitry 214 can compare the second discrepancy counter in the memory 116 to a fourth discrepancy threshold (e.g., a quantity threshold, etc.). Additionally or alternatively, the discrepancy threshold comparator circuitry 214 can compare the frequency of discrepancies to a fourth discrepancy threshold (e.g., a frequency threshold, etc.). In some examples, the fourth discrepancy threshold is greater than the third discrepancy threshold (e.g., the fourth discrepancy threshold is satisfied by a greater number of thresholds, the fourth discrepancy threshold is satisfied by a greater frequency of thresholds, etc.). If the discrepancy threshold comparator circuitry 214 determines the second discrepancy counter and/or the frequency of discrepancies satisfies the fourth discrepancy threshold, the operations 400 advance to block 422. If the discrepancy threshold comparator circuitry 214 determines the discrepancy counter and/or the frequency of discrepancies does not satisfy the second discrepancy threshold, the operations 400 advance to block 424.

At block 422, the user interface circuitry 218 presents an alert indicating a discrepancy between longitudinally aligned ride height sensors via the user interface 106. For example, the user interface circuitry 218 can generate and present a visual alert (e.g., a text indication, a dash light, etc.) to the user via the user interface 106. Additionally or alternatively, the user interface circuitry 218 can generate and present an audio alert and/or tactile alert to the user via the user interface 106. In some examples, the alert can include an indication that one or more of the ride height sensors 114A, 114B, 114C, 114D are to be serviced.

At block 424, the sensor identifier circuitry 220 determines if a sensor potentially causing the discrepancies can be identified based on the discrepancy counters. For example, the sensor identifier circuitry 220 can determine if a sensor causing the discrepancies is to be identified based on one or more discrepancy threshold(s) being satisfied during the execution of blocks 406, 410, 416, 420. In other examples, the sensor identifier circuitry 220 can determine if a potentially discrepancy-causing sensor is to be identified in any other suitable manner. If the sensor identifier circuitry 220 determines a potentially discrepancy causing sensor is to be identified, the operations 400 advance to block 426. If the sensor identifier circuitry 220 determines a potentially discrepancy causing sensor is not to be identified, the operations 400 end.

At block 426, the sensor identifier circuitry 220 identified a potential discrepancy causing sensor. For example, the sensor identifier circuitry 220 can identify a discrepancy causing ride height sensor based on a ride height sensor being associated with multiple discrepancy counters that satisfied a threshold during the execution of blocks 406, 410, 416, 420. For example, if a discrepancy counter associated with discrepancies between the outputs of the first ride height sensor 114A and the second ride height sensor 114B satisfies a threshold during the execution of block 406 and/or block 410 and a discrepancy counter associated with discrepancies between the outputs of the first ride height sensor 114A and the third ride height sensor 114C satisfies a threshold during the execution of block 416 and/or block 420, the sensor identifier circuitry 220 can identify that the first ride height sensor 114A is causing the discrepancies. In some such examples, the sensor identifier circuitry 220 can similarly identify if one or more of the ride height sensors 114B, 114C, 114D is discrepancy causing.

Figure 5:
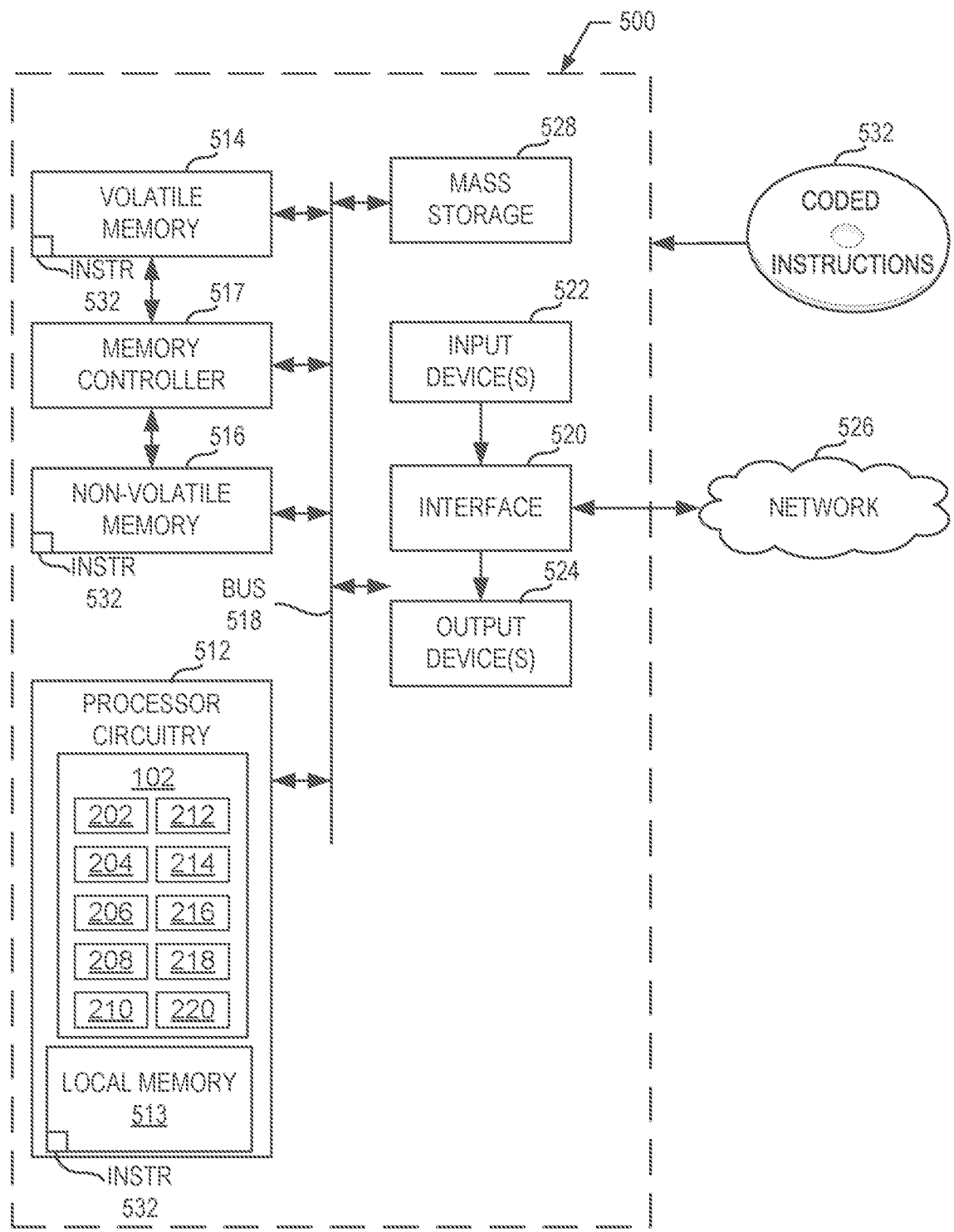
FIG. 5 is a block diagram of an example processing platform including programmable circuitry structured to execute, instantiate, and/or perform the example machine readable instructions and/or perform the example operations of FIGS. 3 and 4 to implement the sensor evaluation circuitry of FIG. 2.

FIG. 5 is a block diagram of an example programmable circuitry platform 500 structured to execute and/or instantiate the example machine-readable instructions and/or the example operations of FIGS. 3 and 4 to implement the sensor evaluation circuitry of FIG. 2. The programmable circuitry platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a Blu-ray player, a gaming console, a headset (e.g., an augmented reality (AR) headset, a virtual reality (VR) headset, etc.) or other wearable device, or any other type of computing and/or electronic device.

The programmable circuitry platform 500 of the illustrated example includes programmable circuitry 512. The programmable circuitry 512 of the illustrated example is hardware. For example, the programmable circuitry 512 can be implemented by one or more integrated circuits, logic circuits, FPGAs, microprocessors, CPUs, GPUs, DSPs, and/or microcontrollers from any desired family or manufacturer. The programmable circuitry 512 may be implemented by one or more semiconductor based (e.g., silicon based) devices. In this example, the programmable circuitry 512 implements the sensor interface circuitry 202, the vehicle condition determiner circuitry 204, the sensor data recorder circuitry 206, the sensor output comparator circuitry 208, the delay determiner circuitry 210, the discrepancy recorder circuitry 212, the discrepancy threshold comparator circuitry 214, the system interface circuitry 216, and the user interface circuitry 218.

The programmable circuitry 512 of the illustrated example includes a local memory 513 (e.g., a cache, registers, etc.). The programmable circuitry 512 of the illustrated example is in communication with main memory 514, 516, which includes a volatile memory 514 and a non-volatile memory 516, by a bus 518. The volatile memory 514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 516 may be implemented by flash memory and/or any other desired type of memory device. Access to the main memory 514, 516 of the illustrated example is controlled by a memory controller 517. In some examples, the memory controller 517 may be implemented by one or more integrated circuits, logic circuits, microcontrollers from any desired family or manufacturer, or any other type of circuitry to manage the flow of data going to and from the main memory 514, 516.

The programmable circuitry platform 500 of the illustrated example also includes interface circuitry 520. The interface circuitry 520 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 522 are connected to the interface circuitry 520. The input device(s) 522 permit(s) a user (e.g., a human user, a machine user, etc.) to enter data and/or commands into the programmable circuitry 512. The input device(s) 522 can be implemented by, for example, an audio sensor, a microphone, a camera (still or video), a keyboard, a button, a mouse, a touchscreen, a trackpad, a trackball, an isopoint device, and/or a voice recognition system.

One or more output devices 524 are also connected to the interface circuitry 520 of the illustrated example. The output device(s) 524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 520 of the illustrated example, thus, typically includes a graphics driver card, a graphics driver chip, and/or graphics processor circuitry such as a GPU.

The interface circuitry 520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 526. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 500 of the illustrated example also includes one or more mass storage discs or devices 528 to store firmware, software, and/or data. Examples of such mass storage discs or devices 528 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 532, which may be implemented by the machine readable instructions of FIGS. 3 and 4, may be stored in the mass storage device 528, in the volatile memory 514, in the non-volatile memory 516, and/or on at least one non-transitory computer readable storage medium such as a CD or DVD which may be removable.

Figure 6:
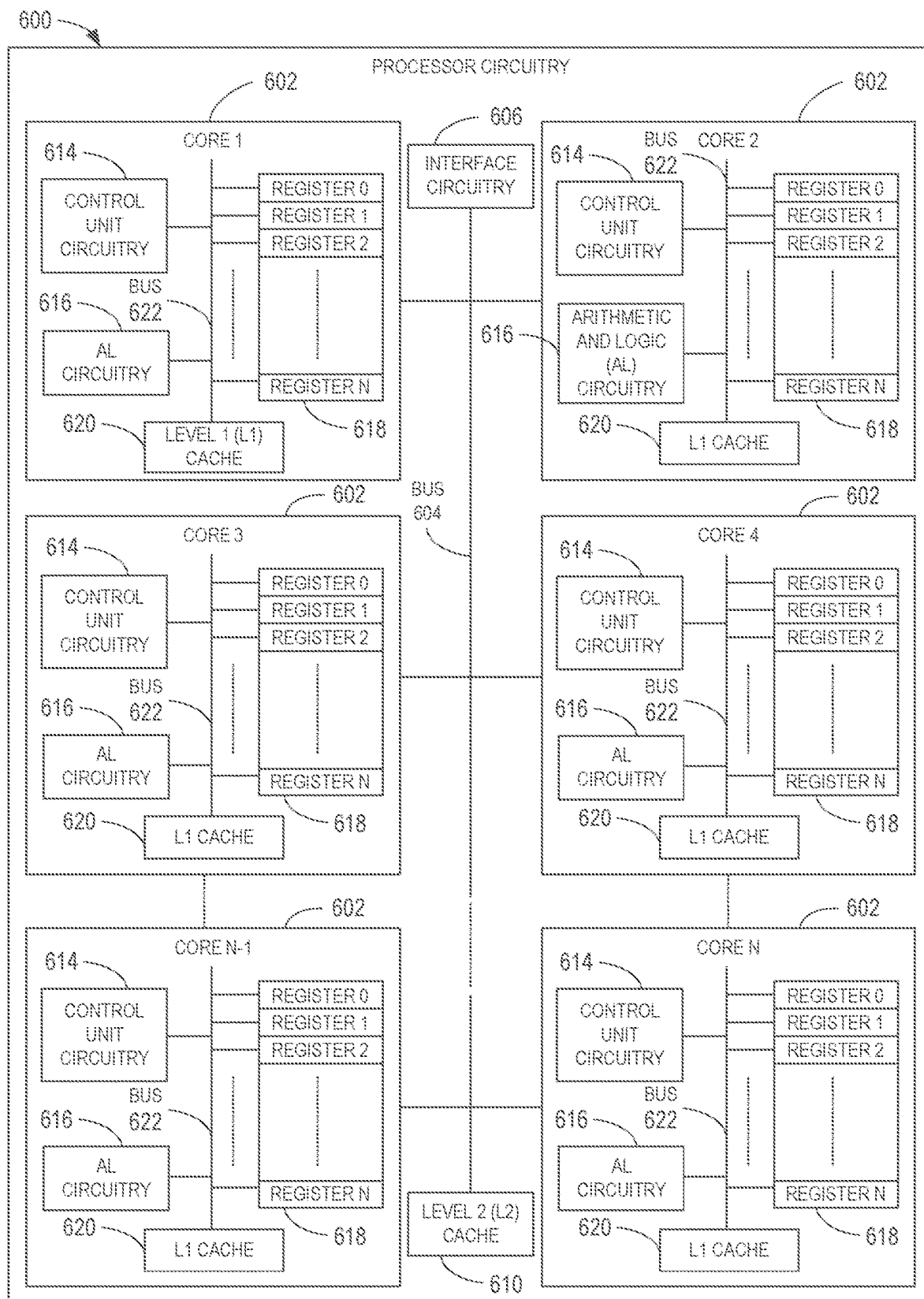
FIG. 6 is a block diagram of an example implementation of the programmable circuitry of FIG. 5.

FIG. 6 is a block diagram of an example implementation of the programmable circuitry 512 of FIG. 5. In this example, the programmable circuitry 512 of FIG. 5 is implemented by a microprocessor 600. For example, the microprocessor 600 may be a general-purpose microprocessor (e.g., general-purpose microprocessor circuitry). The microprocessor 600 executes some or all of the machine-readable instructions of the flowcharts of FIGS. 3 and 4 to effectively instantiate the circuitry of FIG. 2 as logic circuits to perform operations corresponding to those machine readable instructions. In some such examples, the circuitry of FIG. 2 is instantiated by the hardware circuits of the microprocessor 600 in combination with the machine-readable instructions. For example, the microprocessor 600 may be implemented by multi-core hardware circuitry such as a CPU, a DSP, a GPU, an XPU, etc. Although it may include any number of example cores 602 (e.g., 1 core), the microprocessor 600 of this example is a multi-core semiconductor device including N cores. The cores 602 of the microprocessor 600 may operate independently or may cooperate to execute machine readable instructions. For example, machine code corresponding to a firmware program, an embedded software program, or a software program may be executed by one of the cores 602 or may be executed by multiple ones of the cores 602 at the same or different times. In some examples, the machine code corresponding to the firmware program, the embedded software program, or the software program is split into threads and executed in parallel by two or more of the cores 602. The software program may correspond to a portion or all of the machine readable instructions and/or operations represented by the flowcharts of FIGS. 3 and 4.

The cores 602 may communicate by a first example bus 604. In some examples, the first bus 604 may be implemented by a communication bus to effectuate communication associated with one(s) of the cores 602. For example, the first bus 604 may be implemented by at least one of an Inter-Integrated Circuit (I2C) bus, a Serial Peripheral Interface (SPI) bus, a PCI bus, or a PCIe bus. Additionally or alternatively, the first bus 604 may be implemented by any other type of computing or electrical bus. The cores 602 may obtain data, instructions, and/or signals from one or more external devices by example interface circuitry 606. The cores 602 may output data, instructions, and/or signals to the one or more external devices by the interface circuitry 606. Although the cores 602 of this example include example local memory 620 (e.g., Level 1 (L1) cache that may be split into an L1 data cache and an L1 instruction cache), the microprocessor 600 also includes example shared memory 610 that may be shared by the cores (e.g., Level 2 (L2 cache)) for high-speed access to data and/or instructions. Data and/or instructions may be transferred (e.g., shared) by writing to and/or reading from the shared memory 610. The local memory 620 of each of the cores 602 and the shared memory 610 may be part of a hierarchy of storage devices including multiple levels of cache memory and the main memory (e.g., the main memory 514, 516 of FIG. 5). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 602 may be referred to as a CPU, DSP, GPU, etc., or any other type of hardware circuitry. Each core 602 includes control unit circuitry 614, arithmetic and logic (AL) circuitry 616 (sometimes referred to as an ALU), a plurality of registers 618, the local memory 620, and a second example bus 622. Other structures may be present. For example, each core 602 may include vector unit circuitry, single instruction multiple data (SIMD) unit circuitry, load/store unit (LSU) circuitry, branch/jump unit circuitry, floating-point unit (FPU) circuitry, etc. The control unit circuitry 614 includes semiconductor-based circuits structured to control (e.g., coordinate) data movement within the corresponding core 602. The AL circuitry 616 includes semiconductor-based circuits structured to perform one or more mathematic and/or logic operations on the data within the corresponding core 602. The AL circuitry 616 of some examples performs integer based operations. In other examples, the AL circuitry 616 also performs floating-point operations. In yet other examples, the AL circuitry 616 may include first AL circuitry that performs integer-based operations and second AL circuitry that performs floating-point operations. In some examples, the AL circuitry 616 may be referred to as an Arithmetic Logic Unit (ALU).

The registers 618 are semiconductor-based structures to store data and/or instructions such as results of one or more of the operations performed by the AL circuitry 616 of the corresponding core 602. For example, the registers 618 may include vector register(s), SIMD register(s), general-purpose register(s), flag register(s), segment register(s), machine-specific register(s), instruction pointer register(s), control register(s), debug register(s), memory management register(s), machine check register(s), etc. The registers 618 may be arranged in a bank as shown in FIG. 6. Alternatively, the registers 618 may be organized in any other arrangement, format, or structure, such as by being distributed throughout the core 602 to shorten access time. The second bus 622 may be implemented by at least one of an I2C bus, a SPI bus, a PCI bus, or a PCIe bus.

Each core 602 and/or, more generally, the microprocessor 600 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 600 is a semiconductor device fabricated to include many transistors interconnected to implement the structures described above in one or more integrated circuits (ICs) contained in one or more packages.

The microprocessor 600 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 600, in the same chip package as the microprocessor 600 and/or in one or more separate packages from the microprocessor 600.

Figure 7:
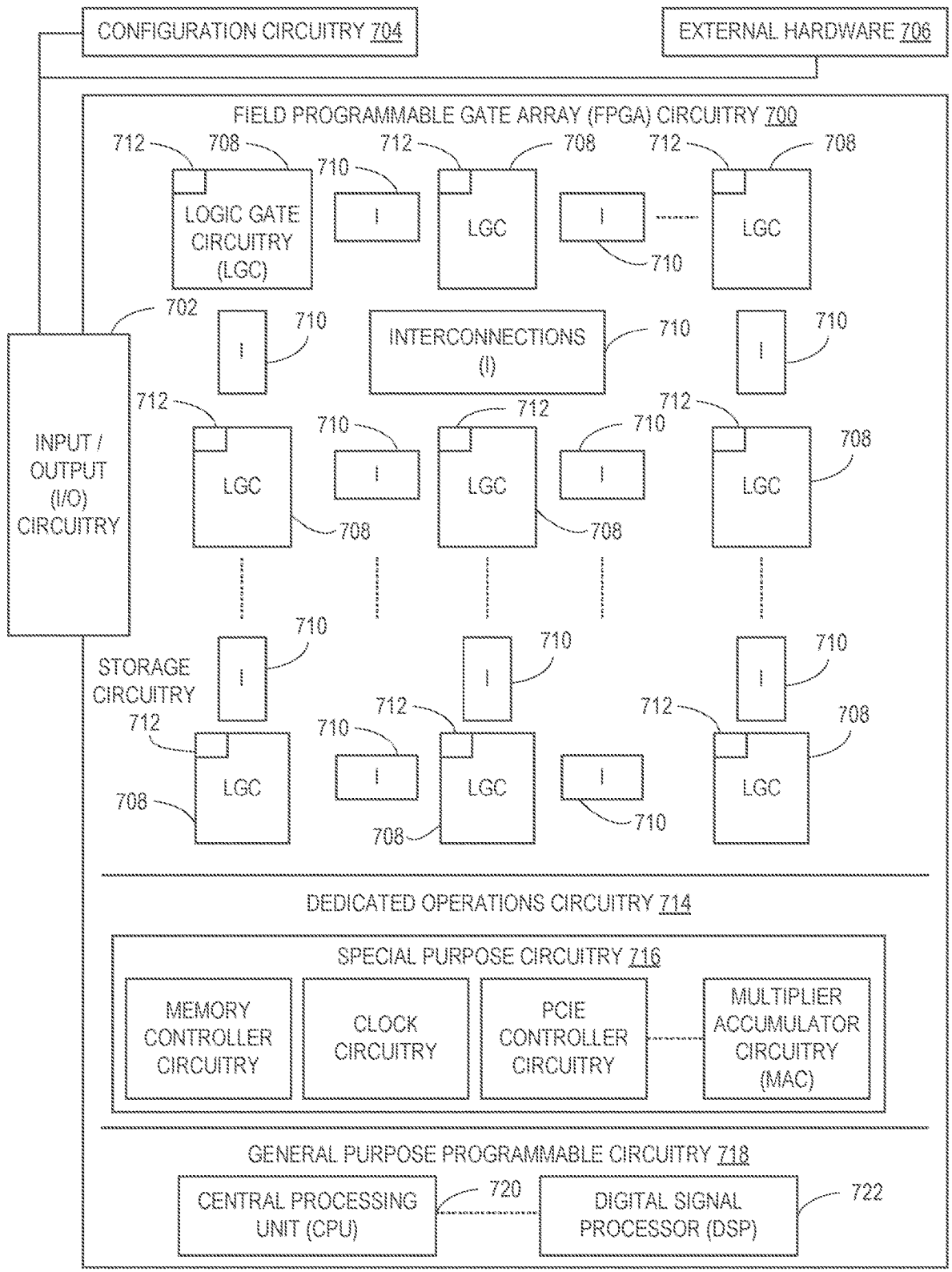
FIG. 7 is a block diagram of another example implementation of the programmable circuitry of FIG. 5.

FIG. 7 is a block diagram of another example implementation of the programmable circuitry 512 of FIG. 5. In this example, the programmable circuitry 512 is implemented by FPGA circuitry 700. For example, the FPGA circuitry 700 may be implemented by an FPGA. The FPGA circuitry 700 can be used, for example, to perform operations that could otherwise be performed by the example microprocessor 600 of FIG. 6 executing corresponding machine readable instructions. However, once configured, the FPGA circuitry 700 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 600 of FIG. 6 described above (which is a general purpose device that may be programmed to execute some or all of the machine readable instructions represented by the flowchart(s) of FIGS. 3 and 4 but whose interconnections and logic circuitry are fixed once fabricated), the FPGA circuitry 700 of the example of FIG. 7 includes interconnections and logic circuitry that may be configured, structured, programmed, and/or interconnected in different ways after fabrication to instantiate, for example, some or all of the operations/functions corresponding to the machine readable instructions represented by the flowchart(s) of FIGS. 3 and 4. In particular, the FPGA circuitry 700 may be thought of as an array of logic gates, interconnections, and switches. The switches can be programmed to change how the logic gates are interconnected by the interconnections, effectively forming one or more dedicated logic circuits (unless and until the FPGA circuitry 700 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 3 and 4. As such, the FPGA circuitry 700 may be configured and/or structured to effectively instantiate some or all of the operations/functions corresponding to the machine readable instructions of the flowchart(s) of FIGS. 3 and 4 as dedicated logic circuits to perform the operations/functions corresponding to those software instructions in a dedicated manner analogous to an ASIC. Therefore, the FPGA circuitry 700 may perform the operations/functions corresponding to the some or all of the machine readable instructions of FIGS. 3 and 4 faster than the general-purpose microprocessor can execute the same.

In the example of FIG. 7, the FPGA circuitry 700 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 700 of FIG. 7 may access and/or load the binary file to cause the FPGA circuitry 700 of FIG. 7 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 700 of FIG. 7 to cause configuration and/or structuring of the FPGA circuitry 700 of FIG. 7, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 700 of FIG. 7 may access and/or load the binary file to cause the FPGA circuitry 700 of FIG. 7 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 700 of FIG. 7 to cause configuration and/or structuring of the FPGA circuitry 700 of FIG. 7, or portion(s) thereof.

The FPGA circuitry 700 of FIG. 7, includes example input/output (I/O) circuitry 702 to obtain and/or output data to/from example configuration circuitry 704 and/or external hardware 706. For example, the configuration circuitry 704 may be implemented by interface circuitry that may obtain a binary file, which may be implemented by a bit stream, data, and/or machine-readable instructions, to configure the FPGA circuitry 700, or portion(s) thereof. In some such examples, the configuration circuitry 704 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 706 may be implemented by external hardware circuitry. For example, the external hardware 706 may be implemented by the microprocessor 600 of FIG. 6.

The FPGA circuitry 700 also includes an array of example logic gate circuitry 708, a plurality of example configurable interconnections 710, and example storage circuitry 712. The logic gate circuitry 708 and the configurable interconnections 710 are configurable to instantiate one or more operations/functions that may correspond to at least some of the machine readable instructions of FIGS. 3 and 4 and/or other desired operations. The logic gate circuitry 708 shown in FIG. 7 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 708 to enable configuration of the electrical structures and/or the logic gates to form circuits to perform desired operations/functions. The logic gate circuitry 708 may include other electrical structures such as look-up tables (LUTs), registers (e.g., flip-flops or latches), multiplexers, etc.

The configurable interconnections 710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 708 to program desired logic circuits.

The storage circuitry 712 of the illustrated example is structured to store result(s) of the one or more of the operations performed by corresponding logic gates. The storage circuitry 712 may be implemented by registers or the like. In the illustrated example, the storage circuitry 712 is distributed amongst the logic gate circuitry 708 to facilitate access and increase execution speed.

The example FPGA circuitry 700 of FIG. 7 also includes example dedicated operations circuitry 714. In this example, the dedicated operations circuitry 714 includes special purpose circuitry 716 that may be invoked to implement commonly used functions to avoid the need to program those functions in the field. Examples of such special purpose circuitry 716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 700 may also include example general purpose programmable circuitry 718 such as an example CPU 720 and/or an example DSP 722. Other general purpose programmable circuitry 718 may additionally or alternatively be present such as a GPU, an XPU, etc., that can be programmed to perform other operations.

Although FIGS. 6 and 7 illustrate two example implementations of the programmable circuitry 512 of FIG. 5, many other approaches are contemplated. For example, FPGA circuitry may include an on-board CPU, such as one or more of the example CPU 720 of FIG. 6. Therefore, the programmable circuitry 512 of FIG. 5 may additionally be implemented by combining at least the example microprocessor 600 of FIG. 6 and the example FPGA circuitry 700 of FIG. 7. In some such hybrid examples, one or more cores 602 of FIG. 6 may execute a first portion of the machine readable instructions represented by the flowchart(s) of FIGS. 3 and 4 to perform first operation(s)/function(s), the FPGA circuitry 700 of FIG. 7 may be configured and/or structured to perform second operation(s)/function(s) corresponding to a second portion of the machine readable instructions represented by the flowcharts of FIGS. 3 and 4, and/or an ASIC may be configured and/or structured to perform third operation(s)/function(s) corresponding to a third portion of the machine readable instructions represented by the flowcharts of FIGS. 3 and 4.

It should be understood that some or all of the circuitry of FIG. 2 may, thus, be instantiated at the same or different times. For example, same and/or different portion(s) of the microprocessor 600 of FIG. 6 may be programmed to execute portion(s) of machine-readable instructions at the same and/or different times. In some examples, same and/or different portion(s) of the FPGA circuitry 700 of FIG. 7 may be configured and/or structured to perform operations/functions corresponding to portion(s) of machine-readable instructions at the same and/or different times.

In some examples, some or all of the circuitry of FIG. 2 may be instantiated, for example, in one or more threads executing concurrently and/or in series. For example, the microprocessor 600 of FIG. 6 may execute machine readable instructions in one or more threads executing concurrently and/or in series. In some examples, the FPGA circuitry 700 of FIG. 7 may be configured and/or structured to carry out operations/functions concurrently and/or in series. Moreover, in some examples, some or all of the circuitry of FIG. 2 may be implemented within one or more virtual machines and/or containers executing on the microprocessor 600 of FIG. 6.

In some examples, the programmable circuitry 512 of FIG. 5 may be in one or more packages. For example, the microprocessor 600 of FIG. 6 and/or the FPGA circuitry 700 of FIG. 7 may be in one or more packages. In some examples, an XPU may be implemented by the programmable circuitry 512 of FIG. 5, which may be in one or more packages. For example, the XPU may include a CPU (e.g., the microprocessor 600 of FIG. 6, the CPU 720 of FIG. 7, etc.) in one package, a DSP (e.g., the DSP 722 of FIG. 7) in another package, a GPU in yet another package, and an FPGA (e.g., the FPGA circuitry 700 of FIG. 7) in still yet another package.

Methods and apparatus to identify ride height sensor discrepancies are disclosed herein. Further examples and combinations thereof include the following:

Example 1 includes an apparatus comprising machine readable instructions, and programmable circuitry to at least one of instantiate or execute the machine readable instructions to compare a first sensor output of a first ride height sensor of a vehicle to a second sensor output of a second ride height sensor of the vehicle, increment a discrepancy counter based on the comparison of the first sensor output and the second sensor output, and generate an indication to service at least one of the first ride height sensor or the second ride height sensor after the discrepancy counter satisfies a threshold.

Example 2 includes the apparatus of example 1, wherein the first ride height sensor is associated with a first wheel of the vehicle, the second ride height sensor is associated with a second wheel of the vehicle, the second wheel is longitudinally aligned with the first wheel, and the programmable circuitry is to access the first sensor output, the first sensor output generated at a first time, and access the second sensor output, the second sensor output generated at a second time separated from the first time by a delay.

Example 3 includes the apparatus of example 2, wherein the programmable circuitry is to determine the delay based on a speed of the vehicle and a wheelbase of the vehicle.

Example 4 includes the apparatus of example 1, wherein the programmable circuitry is further to compare a speed of the vehicle to a speed threshold, the comparison of the first sensor output and the second sensor output occurring after determining the speed satisfies the speed threshold.

Example 5 includes the apparatus of example 1, wherein the programmable circuitry is further to compare an acceleration of the vehicle to an acceleration threshold, the comparison of the first sensor output and the second sensor output occurring after determining the acceleration satisfies the acceleration threshold.

Example 6 includes the apparatus of example 1, wherein the threshold is a frequency-based threshold and wherein the programmable circuitry is further to determine a frequency of discrepancies based on the discrepancy.

Example 7 includes the apparatus of example 1, wherein the indication is an on-board diagnostic code.

Example 8 includes a non-transitory machine readable storage medium comprising instructions to cause programmable circuitry to at least compare a first sensor output of a first ride height sensor of a vehicle to a second sensor output of a second ride height sensor of the vehicle, increment a discrepancy counter based on the comparison of the first sensor output and the second sensor output, and generate an indication to service at least one of the first ride height sensor or the second ride height sensor after the discrepancy counter satisfies a threshold.

Example 9 includes the non-transitory machine readable storage medium of example 8, wherein the first ride height sensor is associated with a first wheel of the vehicle, the second ride height sensor is associated with a second wheel of the vehicle, the second wheel is longitudinally aligned with the first wheel, and the instructions, when executed, further cause the programmable circuitry to access the first sensor output, the first sensor output generated at a first time, and access the second sensor output, the second sensor output generated at a second time separated from the first time by a delay.

Example 10 includes the non-transitory machine readable storage medium of example 9, wherein the instructions, when executed, further cause the programmable circuitry to determine the delay based on a speed of the vehicle and a wheelbase of the vehicle.

Example 11 includes the non-transitory machine readable storage medium of example 8, wherein the instructions, when executed, further cause the programmable circuitry to compare a speed of the vehicle to a speed threshold, the comparison of the first sensor output and the second sensor output occurring after determining the speed satisfies the speed threshold.

Example 12 includes the non-transitory machine readable storage medium of example 8, wherein the instructions, when executed, further cause the programmable circuitry to compare an acceleration of the vehicle to an acceleration threshold, the comparison of the first sensor output and the second sensor output occurring after determining the acceleration satisfies the acceleration threshold.

Example 13 includes the non-transitory machine readable storage medium of example 8, wherein the threshold is a frequency-based threshold and instructions, when executed, further cause the programmable circuitry to is further to determine a frequency of discrepancies based on the discrepancy.

Example 14 includes the non-transitory machine readable storage medium of example 8, wherein the indication is an on-board diagnostic code.

Example 15 includes a method comprising comparing a first sensor output of a first ride height sensor of a vehicle to a second sensor output of a second ride height sensor of the vehicle, incrementing a discrepancy counter based on the comparison of the first sensor output and the second sensor output, and generating an indication to service at least one of the first ride height sensor or the second ride height sensor after the discrepancy counter satisfies a threshold.

Example 16 includes the method of example 15, wherein the first ride height sensor is associated with a first wheel of the vehicle, the second ride height sensor is associated with a second wheel of the vehicle, the second wheel is longitudinally aligned with the first wheel, and the method further includes accessing the first sensor output, the first sensor output generated at a first time, and accessing the second sensor output, the second sensor output generated at a second time separated from the first time by a delay.

Example 17 includes the method of example 16, further including determining the delay based on a speed of the vehicle and a wheelbase of the vehicle.

Example 18 includes the method of example 15, further including comparing a speed of the vehicle to a speed threshold, the comparison of the first sensor output and the second sensor output occurring after determining the speed satisfies the speed threshold.

Example 19 includes the method of example 15, further including comparing an acceleration of the vehicle to an acceleration threshold, the comparison of the first sensor output and the second sensor output occurring after determining the acceleration satisfies the acceleration threshold.

Example 20 includes the method of example 15, wherein the indication is an on-board diagnostic code.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
   machine readable instructions; and
   programmable circuitry to at least one of instantiate or execute the machine readable instructions to:
   access a first sensor output, the first sensor output generated at a first time, the first sensor output associated with a first ride height sensor of a vehicle, the first ride height sensor is associated with a first wheel of the vehicle;
   access a second sensor output, the second sensor output generated at a second time separated from the first time by a delay, the second sensor output associated with a second ride height sensor of the vehicle, the second ride height sensor is associated with a second wheel of the vehicle, the second wheel is longitudinally aligned with the first wheel;
   compare the first sensor output to the second sensor output;
   increment a discrepancy counter based on the comparison of the first sensor output and the second sensor output; and
   generate an indication to service at least one of the first ride height sensor or the second ride height sensor after the discrepancy counter satisfies a threshold.

2. The apparatus of claim 1, wherein the programmable circuitry is to determine the delay based on a speed of the vehicle and a wheelbase of the vehicle.

3. The apparatus of claim 1, wherein the programmable circuitry is further to compare a speed of the vehicle to a speed threshold, the comparison of the first sensor output and the second sensor output occurring after determining the speed satisfies the speed threshold.

4. The apparatus of claim 1, wherein the programmable circuitry is further to compare an acceleration of the vehicle to an acceleration threshold, the comparison of the first sensor output and the second sensor output occurring after determining the acceleration satisfies the acceleration threshold.

5. The apparatus of claim 1, wherein the threshold is a frequency-based threshold and wherein the programmable circuitry is further to determine a frequency of discrepancies based on the discrepancy counter.

6. The apparatus of claim 1, wherein the indication is an on-board diagnostic code.

7. A non-transitory machine readable storage medium comprising instructions to cause programmable circuitry to at least:
   access a first sensor output, the first sensor output generated at a first time, the first sensor output associated with a first ride height sensor of a vehicle, the first ride height sensor is associated with a first wheel of the vehicle;
   access a second sensor output, the second sensor output generated at a second time separated from the first time by a delay, the second sensor output associated with a second ride height sensor of the vehicle, the second ride height sensor is associated with a second wheel of the vehicle, the second wheel is longitudinally aligned with the first wheel;
   compare the first sensor output to the second sensor output;
   increment a discrepancy counter based on the comparison of the first sensor output and the second sensor output; and
   generate an indication to service at least one of the first ride height sensor or the second ride height sensor after the discrepancy counter satisfies a threshold.

8. The non-transitory machine readable storage medium of claim 7, wherein the instructions, when executed, further cause the programmable circuitry to determine the delay based on a speed of the vehicle and a wheelbase of the vehicle.

9. The non-transitory machine readable storage medium of claim 7, wherein the instructions, when executed, further cause the programmable circuitry to compare a speed of the vehicle to a speed threshold, the comparison of the first sensor output and the second sensor output occurring after determining the speed satisfies the speed threshold.

10. The non-transitory machine readable storage medium of claim 7, wherein the instructions, when executed, further cause the programmable circuitry to compare an acceleration of the vehicle to an acceleration threshold, the comparison of the first sensor output and the second sensor output occurring after determining the acceleration satisfies the acceleration threshold.

11. The non-transitory machine readable storage medium of claim 7, wherein the threshold is a frequency-based threshold and instructions, when executed, further cause the programmable circuitry to is further to determine a frequency of discrepancies based on the discrepancy counter.

12. The non-transitory machine readable storage medium of claim 7, wherein the indication is an on-board diagnostic code.

13. A method comprising:
   accessing a first sensor output, the first sensor output generated at a first time, the first sensor output associated with a first ride height sensor of a vehicle, the first ride height sensor is associated with a first wheel of the vehicle;
   accessing a second sensor output, the second sensor output generated at a second time separated from the first time by a delay, the second sensor output associated with a second ride height sensor of the vehicle, the second ride height sensor is associated with a second wheel of the vehicle, the second wheel is longitudinally aligned with the first wheel;
   comparing the first sensor output of a first ride height sensor of a vehicle to the second sensor output of a second ride height sensor of the vehicle;

incrementing a discrepancy counter based on the comparison of the first sensor output and the second sensor output; and generating an indication to service at least one of the first ride height sensor or the second ride height sensor after the discrepancy counter satisfies a threshold.

14. The method of claim 13, further including determining the delay based on a speed of the vehicle and a wheelbase of the vehicle.

15. The method of claim 13, further including comparing a speed of the vehicle to a speed threshold, the comparison of the first sensor output and the second sensor output occurring after determining the speed satisfies the speed threshold.

16. The method of claim 13, further including comparing an acceleration of the vehicle to an acceleration threshold, the comparison of the first sensor output and the second sensor output occurring after determining the acceleration satisfies the acceleration threshold.

17. The method of claim 13, wherein the indication is an on-board diagnostic code.

* * * * *